United States Patent
Hogo et al.

(10) Patent No.: US 9,176,005 B2
(45) Date of Patent: Nov. 3, 2015

(54) SENSOR UNIT-ACTUATING MECHANISM AND LIQUID CRYSTAL DISPLAY DEVICE PROVIDED WITH SENSOR UNIT-ACTUATING MECHANISM

(75) Inventors: Hidekazu Hogo, Ishikawa (JP); Makoto Kitamura, Ishikawa (JP)

(73) Assignee: EIZO Corporation, Ishikawa (JP)

( * ) Notice: Subject to any disclaimer, the term of this patent is extended or adjusted under 35 U.S.C. 154(b) by 259 days.

(21) Appl. No.: 13/883,229

(22) PCT Filed: Jun. 9, 2011

(86) PCT No.: PCT/JP2011/063276
§ 371 (c)(1),
(2), (4) Date: May 2, 2013

(87) PCT Pub. No.: WO2012/060129
PCT Pub. Date: May 10, 2012

(65) Prior Publication Data
US 2013/0214141 A1   Aug. 22, 2013

(30) Foreign Application Priority Data

Nov. 5, 2010   (JP) ................. 2010-249141

(51) Int. Cl.
*H01H 37/50*   (2006.01)
*G01J 1/04*   (2006.01)
*G01D 11/24*   (2006.01)

(52) U.S. Cl.
CPC ............ *G01J 1/0403* (2013.01); *G01D 11/24* (2013.01)

(58) Field of Classification Search
CPC . H01H 37/323; H01H 61/0107; H01H 71/16; H01H 71/145; H01H 2300/034; H01H 2061/0115; H01H 2061/0122; G01K 5/483; G12B 1/00; G05D 23/024
USPC ................... 250/221; 337/139, 140, 382, 395
See application file for complete search history.

(56) References Cited

U.S. PATENT DOCUMENTS 7,345,669 B2    3/2008   Ohashi et al.
2008/0204437 A1  8/2008   Jensen
(Continued)

FOREIGN PATENT DOCUMENTS

JP    2-101239 U    8/1990
JP    9-095913 A    4/1997
(Continued)

OTHER PUBLICATIONS

International Search Report dated Jul. 19, 2011, as issued in corresponding International Patent Application No. PCT/JP2011/063276 (with English translation—4 pgs).

(Continued)

*Primary Examiner* — Thanh Luu
*Assistant Examiner* — Renee D Chavez
(74) *Attorney, Agent, or Firm* — Maier & Maier, PLLC

(57) ABSTRACT

A novel sensor unit actuating mechanism that can cause a sensor unit to leave or enter a frame smoothly even when the thickness of the frame is reduced and that has a mechanism for coping with a prank by a child or the like, such as a push-back of the sensor unit. The sensor unit actuating mechanism includes a frame, a sensor unit including an optical sensor, a spring member configured to expand or contract in a Y direction, actuators configured to contract against the resilience of the spring member when energized, and a guide member for moving the sensor unit linearly in an X direction. When the actuator is energized, the sensor unit, is linearly moved from inside the frame to the measurement position; when the actuator is energized, the sensor unit is linearly moved from the measurement position to inside the frame and stored therein.

7 Claims, 18 Drawing Sheets

(56) References Cited

U.S. PATENT DOCUMENTS

| | | |
|---|---|---|
| 2008/0250858 A1 | 10/2008 | Park |
| 2009/0009501 A1 | 1/2009 | Shiba |
| 2011/0032628 A1 | 2/2011 | Tanimura et al. |

FOREIGN PATENT DOCUMENTS

| | | |
|---|---|---|
| JP | 2000-205113 A | 7/2000 |
| JP | 4067282 B | 9/2002 |
| JP | 2004-100537 A | 4/2004 |
| JP | 4233290 B | 9/2004 |
| JP | 3984996 B | 10/2004 |
| JP | 2005-208548 A | 8/2005 |
| JP | 2008-261856 A | 10/2008 |
| JP | 2009-014699 A | 1/2009 |
| WO | 2009/093645 A1 | 7/2009 |

OTHER PUBLICATIONS

Australian Office Action and Search report dated Oct. 3, 2014 from corresponding Australian Patent Application No. 2011324665; 6 pgs.

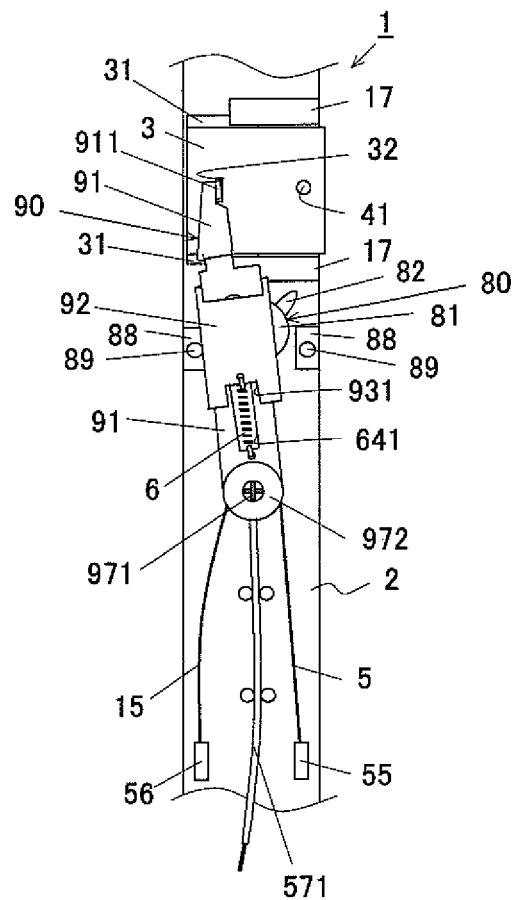
Fig. 19
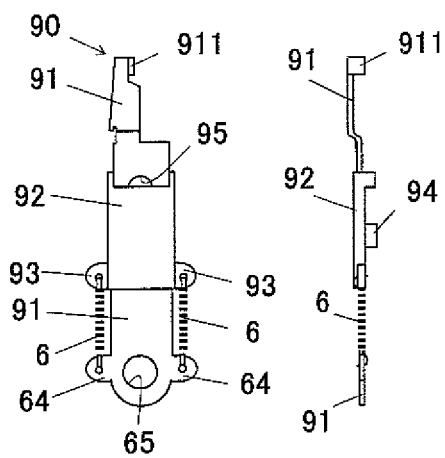
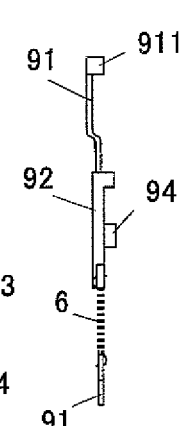
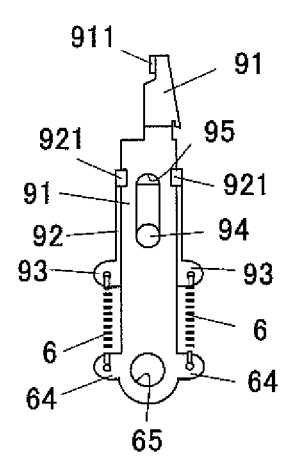
Fig. 20(a)    Fig. 20(b)    Fig. 20(c)

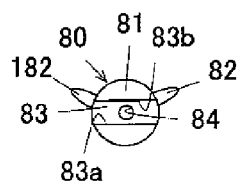
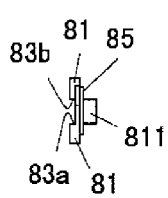
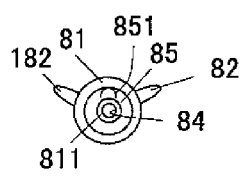
Fig. 21(a)  Fig. 21(b)  Fig. 21(c)
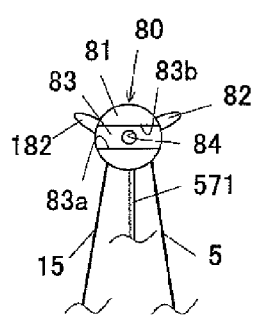
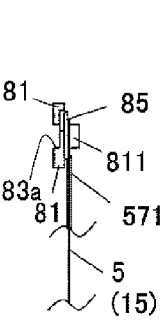
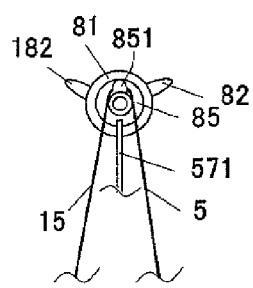
Fig. 22(a)  Fig. 22(b)  Fig. 22(c)
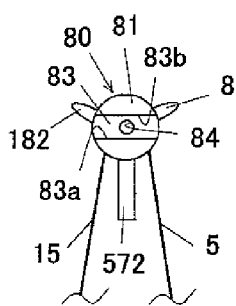
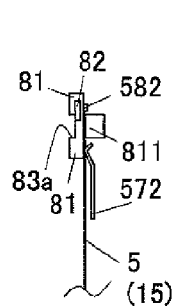
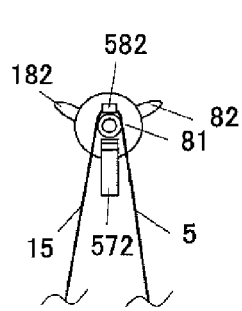
Fig. 23(a)  Fig. 23(b)  Fig. 23(c)
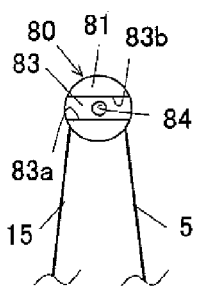
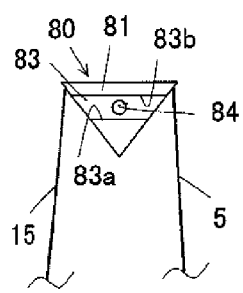
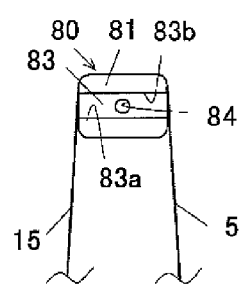
Fig. 24(a)  Fig. 24(b)  Fig. 24(c)

SENSOR UNIT-ACTUATING MECHANISM AND LIQUID CRYSTAL DISPLAY DEVICE PROVIDED WITH SENSOR UNIT-ACTUATING MECHANISM

RELATED APPLICATIONS

This is the U.S. national stage application which claims priority under 35 USC. §371 to International Patent Application No.: PCT/JP2011/063276 filed on Jun. 9, 2011, which claims priority to Japanese Patent Application No. 2010-249141 flied on Nov. 5, 2010, the disclosures of which are incorporated by to reference herein their entireties.

TECHNICAL FIELD

The present invention relates to a sensor unit actuating mechanism configured to move, to a predetermined measurement position, a sensor unit including a sensor for measuring a physical quantity from an object to be measured, and a liquid crystal display device including the sensor unit actuating mechanism.

BACKGROUND ART

Image display monitors are being used not only in offices or households but also at sites of various kinds of professional work, such as graphic design and medical care. In particular, high-end liquid crystal monitors are being used to display a graphic design image or medical diagnostic image, since display of such images requires high-definition image quality having high reproducibility. Such a liquid crystal monitor, which is required to provide high-definition image quality having high reproducibility, attempts to enhance the reproducibility of display images by measuring an optical property of a liquid crystal screen, such as luminance, chromaticity, or the amount of light, using a physical quantity sensor such as an optical sensor, and then performing calibration on the basis of the measured data.

To enhance the reproducibility of display images, calibration must be performed every predetermined time. For this reason, a sensor unit actuating mechanism for measuring an optical property of a liquid crystal screen is integrated into a liquid crystal monitor (see Patent Document 1), or an optical measuring instrument including a sensor unit actuating mechanism for measuring an optical property of a liquid crystal screen is disposed adjacent to a bezel (frame) of a liquid crystal monitor (see Patent Document 2).

Patent Document 1 states that a movable optical measuring instrument 104 is disposed at one of the four corners of a liquid crystal display device including a rectangular liquid crystal screen 101 and a bezel 102 disposed around the liquid crystal screen 101 (FIG. 27 of the present application). Patent Document 2 shows three positions at which an optical measuring unit 108 including an optical measuring instrument 104 can be disposed on a bezel 102: at one corner of the bezel 102; at a side portion around the center of the upper-side bezel 102; and at a side portion around the center of the lateral-side bezel 102 (FIG. 28 of the present application). The optical measuring instrument 104 is a planar unit including a physical quantity sensor, such as an optical sensor, and will be referred to as a sensor unit. Both the sensor unit actuating mechanisms for screen measurement described Patent Documents 1 and 2 are mechanisms that revolve the sensor unit using an electric motor and a drive transmission mechanism, such as a gear box, in such a manner that the sensor unit draws a circle whose center is at a point around the center of one side of the bezel (frame) or on one corner of the bezel.

To meet the high-reproducibility, high-definition image quality requirement, the above-mentioned liquid crystal display devices are required to accurately measure the optical property of the display screen, such as luminance or chromaticity, without being affected by ambient external light during calibration, by placing the sensor for measuring a physical quantity, such as luminance or chromaticity, at a measurement position adjacent to the monitor screen over the monitor screen. The liquid crystal display devices are also required to have high functionality, such as the size or viewability of displayed images, and high designability, and in this regard, the thickness of the bezel is reduced to obtain a flat face. Accordingly, it is desired to prevent the sensor unit actuating mechanism from restricting the appearance and shape of the liquid crystal display device and thus impairing designability.

However, the mechanisms described in Patent Documents 1 and 2 employ a system which causes the sensor unit to leave or enter the frame or measuring instrument and revolve. Accordingly, the mechanisms use the electric motor and drive transmission mechanism so as to obtain a torque necessary to cause the arm of the sensor unit to revolve. This makes the mechanisms large-scale. In other words, there is a need to reserve space for housing the electric motor and the drive transmission mechanism, thereby forming a design limitation. Further, an increase in the size of the sensor unit actuating mechanism for screen measurement affects the designability of the liquid crystal display device.

Miniaturization or space-saving of mechanical elements has been contemplated with respect to various types of industrial products. Actuators using a shape-memory alloy wire have been commercialized as small actuators for replacing an electric motor in recent years. For example, a thinner endoscope imposes a smaller load on an object to be observed when inserted thereinto. For this reason, multiple shape-memory alloy wires having a property of contracting when heated are previously mounted on the tip of an endoscope cable; wiring is installed such that current is passed through each of these shape-memory alloy wires; and a predetermined one of these shape-memory alloy wires generates Joule heat when energized and thus contracts; and consequently the tip of the endoscope cable is bent in a predetermined direction. Such an electric actuator enables traditional small machines incapable of incorporating an electric motor to have a motion function. Accordingly, various efforts to utilize such an electric actuator have been made, and related patent applications have been filed (Patent Documents 3, 4).

Patent Document 3 discloses an actuator which actuates a crank mechanism by combining two shape-memory alloy wires, the crank mechanism, and an extension spring attached to an actuator member of the crank mechanism and then energizing one of the shape-memory alloy wires to contract it and thus moves the actuator member to a predetermined stable position using the tensile force of the extension spring; and actuates the crank mechanism toward the opposite side by energizing the other shape-memory alloy wire to contract it and thus moves the actuator member to a predetermined opposite stable position using the tensile force of the extension spring. Patent Document 4 discloses an actuator which actuates an actuator member of a crank mechanism by combining two shape-memory alloy wires, the crank mechanism, and a pressing spring and then energizing one of the shape-memory alloy wires to contract it and thus moves the actuator member to a predetermined stable position using the pressing force of the pressing spring attached to the outside of the crank mechanism; and actuates the actuator member toward the opposite side by energizing the other shape-memory alloy wire to contract it and thus moves the actuator member to a predetermined opposite stable position using the pressing force of the extension spring. The electric actuators described in Patent Documents 3 and 4 have a configuration in which the actuator member of the crank mechanism revolves in a manner to draw an arc and performs a switching operation. However, these Patent Documents do not disclose any specific applications or the like except for such a configuration.

PRIOR ART DOCUMENTS

Patent Documents

Patent Document 1: Japanese Patent No. 3984996
Patent Document 2: JP-A-2005-208548
Patent Document 3: Japanese Patent No. 4067282
Patent Document 4: Japanese Patent No. 4233290

SUMMARY OF THE INVENTION

Problems to be Solved by the Invention

As described above, high-end image display devices measure an optical property of the display screen, such as luminance, chromaticity, or the amount of light, using a sensor unit and perform calibration on the basis of the measured data. In the future, low-cost image display devices will also need to perform calibration using a sensor unit. As described above, Patent Documents 1 and 2 employ the system which causes the sensor unit to leave or enter the frame or measuring instrument and revolve. Accordingly, the mechanisms use the electric motor and drive transmission mechanism so as to obtain a torque necessary to cause the arm of the sensor unit to revolve. This makes the mechanism large-scale. In other words, there is a need to reserve space for housing the electric motor and the drive transmission mechanism, forming a design limitation. Further, an increase in the size of the sensor unit actuating mechanism for screen measurement affects the designability of the liquid crystal display device. While electric actuators using a shape-memory alloy wire have been commercialized as small actuators for replacing an electric motor, it seems that any practical structure of a sensor unit actuating mechanism has not been sufficiently contemplated. The electric actuators described in Patent Documents 3 and 4 actuate the actuator member of the crank mechanism using the contraction force of the shape-memory alloy wire; however, these electric actuators are disadvantageous in that the actuator member revolves in a manner to draw an arc and performs a switching operation and thus suffers a large loss in the stroke displacement of the switching operation.

To enhance the reproducibility of display images, the sensor unit for screen measurement moves the sensor unit from the frame onto the screen and performs calibration every predetermined time. Since image display devices are being used in a variety of places, a child or the like may push back the sensor unit on the screen toward the frame out of curiosity. In this case, it is natural to think that the direction in which the child or the like pushes back the sensor unit is the direction of a straight line extending from on the screen outward (toward the frame). Accordingly, in the traditional system which causes the arm of the sensor unit to revolve, the sensor unit has difficulty in returning smoothly when the child or the like pushes back the sensor unit out of curiosity. This can cause a failure easily. Conceivable methods for coping with this type of prank include displaying a warning on the image display device to draw attention and additionally providing a safety mechanism for detecting a human and then storing the sensor unit in the frame. The former aims at a prevention effect but is not an essential measure; therefore, any significant effect is not expected. On the other hand, the latter would make the actuation mechanism more large-scale and more complicated.

Accordingly, an object of the present invention is to provide a novel sensor unit actuating mechanism that allows a sensor unit to leave or enter the frame smoothly even when the thickness of the frame is reduced and that has a mechanism for coping with a prank by a child or the like, such as a push-back of the sensor unit.

Means for Solving the Problems

A sensor unit actuating mechanism of the present invention includes: a frame disposed in a frame region around an object to be measured; a sensor unit including a sensor for measuring a physical quantity from the object to be measured; a guide member disposed in an X direction and configured to move the sensor unit linearly; a spring member configured to expand or contract in a Y direction; and an actuator configured to expand or contract in the Y direction. Either by energizing the actuator to contract against resilience of the spring or by causing the spring to operate when the actuator is energized to contract, the sensor unit is linearly moved from inside the frame to a measurement position in the X direction.

According to the present invention, either by energizing the actuator to contract against the resilience of the spring member or by causing the spring to operate when the actuator contracts, the sensor unit is linearly moved from inside the frame to the measurement position in the X direction. Accordingly, the sensor unit is linearly moved in the X direction using the contraction force of the actuator in the Y direction. As a result, a loss in stroke displacement is reduced, and the sensor unit leaves or enters the frame smoothly.

In the present specification, the relationship between the X direction and the Y direction is a relationship where if the X direction is a horizontal direction when the frame is seen from the front side, the Y direction is a vertical direction or a relationship where if the X direction is a vertical direction when the frame is seen from the front side, the Y direction is a horizontal direction. As used herein, the Y direction is defined as a direction whose angle is in a range of 45° to 135° or −45° to −135° when the X direction is, for example, a horizontal direction and has an angle of 0°. Alternatively, the Y direction is defined as a direction whose angle is in a range of −45° to 45° or −135° to −225° when the X direction is, for example, a vertical direction and has an angle of 90°.

Sensors for measuring the physical quantity include optical sensors, CCD sensors, color sensors, and infrared sensors.

Examples of the guide member include a guide member where a protruding member serving as a slide rail is disposed on the sensor unit and a recessed member serving as a slide guide is disposed on the frame and a guide member where a protruding member serving as a slide rail is disposed on the frame and a recessed member serving as a slide guide is disposed on the sensor unit.

Examples of the spring member include extension springs and pressing springs, and examples of the shape thereof include coiled, spiral, and string-shaped. The spring member is preferably a coiled extension spring. Use of a coiled extension spring allows a long stroke of resilience to be set. This makes it easy to increase the stroke of movement of the sensor unit.

The actuator refers to an actuator that contracts against the resilience of the spring member when energized. Examples of the actuator include shape-memory alloy actuators, electrostriction actuators, and examples of the shape thereof include wire-shaped, planar, coiled, spiral, cylindrical, and prismatic. Planar and wire-shaped actuators can be disposed with a high degree of freedom even in a thin, narrow place. Direct current or alternating current is selected for energizing the actuator, depending on the characteristics of the actuator to be energized.

The actuator of the present invention is preferably a shape-memory alloy wire which contracts when energized and thus heated. The reason is that use of a shape-memory alloy wire makes it easy to increase the amount of displacement due to energization.

Examples of the material of which the shape-memory alloy wire is made include titanium-nickel alloys and iron-manganese-silicon alloys. Examples of the shape of the shape-memory alloy wire include solid wires, stranded wires, coils, and spring-shaped wires. A shape-memory alloy wire having a larger diameter can generate a greater contraction force but requires larger energizing current and is less responsive when cooled. In contrast, a shape-memory alloy wire having a smaller diameter generates a smaller contraction force but requires smaller energizing current and is more responsive. The diameter of the shape-memory alloy wire is set in a range of, for example, 0.05 to 0.15 mm. The temperature in the vicinity of the monitor screen of the operating image display device may increase from room temperature to around 50° C. Accordingly, to prevent a malfunction due to the temperature, a setting must be made such that the temperature of Joule heat generated by energizing the shape-memory alloy wire exceeds 50° C. For this purpose, the heating temperature of the energized shape-memory alloy wire is preferably 60° C. or more, more preferably about 70° C. for a stable contraction operation.

The sensor unit actuating mechanism of the present invention uses a shape-memory alloy wire in place of an electric motor and thus has an extremely small thickness. Accordingly, this sensor unit actuating mechanism is inconspicuous even when disposed on the bezel (frame) of a liquid crystal display device which is strongly required to be thinner, and has a mechanism for coping with a prank by a child or the like, such as a push-back of the sensor unit. Further, incorporation of the sensor unit actuating mechanism of the present invention into a bezel around a liquid crystal screen results in a liquid crystal display device having high designability. Current needed for energization can be supplied from a power supply included in the liquid crystal display device.

The sensor unit actuating mechanism of the present invention further includes a flexible balance member having a base coupled to the frame. An end of the actuator is fixed to the balance member. When an external force to push back the sensor unit from the measurement position to into the frame in the X direction is applied to the sensor unit, the balance member is bent to relax the external force.

According to the present invention, when an external force to push back the sensor unit into the frame is applied to the sensor unit located at the measurement position, the balance member is bent to relax the external force. This makes it difficult for a load (external force) to be directly imposed on the actuator, thereby providing a sensor unit actuating mechanism having high operation reliability.

In the present invention, for example, a pair of arcuate members each having a base coupled to the frame may be disposed in the Y direction as the balance members, and an end of the shape-memory alloy wire may be fixed to an end of each arcuate member. In this configuration, for the sensor to make a measurement, the shape-memory alloy wire is energized to linearly move the sensor unit to a measurement position; the energization is continued during the measurement by the sensor; and after the measurement, the shape-memory alloy wire is de-energized to return the sensor unit to its original position. In this configuration, an end of the shape-memory alloy wire is fixed to an end of each arcuate member, and these arcuate members are bent to relax the external force. Accordingly, no link mechanism or crank mechanism is included, allowing a sensor unit actuating mechanism to be formed using a minimum number of components. According to the present invention, only de-energizing the shape-memory alloy wire after the measurement allows the resilience of the spring member to be exerted. Thus, the sensor unit is returned to its original position.

The sensor unit actuating mechanism of the present invention further includes a rotatable balance member having a shaft coupled to the frame in place of the above-mentioned balance member, and an end of the actuator is fixed to the balance member. When an external force to push back the sensor unit from the measurement position into the frame in the X direction is applied to the sensor unit, the balance member rotates to relax the external force.

According to the present invention, when an external force to push back the sensor unit located at the measurement position into the frame is applied to the sensor unit, the balance member rotates to relax the external force. Accordingly, there is provided a sensor unit actuating mechanism where a load (external force) is not easily directly imposed on the actuator and that has high operation reliability.

In the present invention, for example, a rotational member having a shaft coupled to the frame may be disposed as the balance member; an end of the actuator (shape-memory alloy wire) may be fixed to an end of the rotational member; and the rotational member may rotate when pulled. In this configuration, for the sensor to make a measurement, the actuator is energized to cause the rotational member to rotate, thus the sensor unit is linearly moved to the measurement position, and the sensor unit is de-energized during the measurement by the sensor.

The sensor unit actuating mechanism of the present invention further includes a movable arm having a tip that stops in the sensor unit in an engaged state, the movable arm being rotatable using a base thereof as a rotational axis. A slider capable of sliding in the Y direction is disposed in a main body of the movable arm. A shaft of the balance member (rotational member) is coupled to the frame. An end of the spring member stops at a base of the main body of the movable arm in an engaged state to pull back the slider, and the other end thereof stops at the slider in an engaged state. An end of the actuator is fixed to the balance member to cause the balance member to start rotating forward, and the other end thereof is coupled to the frame. The movable arm and the balance member interlock with each other. The actuator is energized to contract against the resilience of the spring, thereby causing the balance member to start rotating forward, and the slider is subsequently pulled back using the resilience of the spring member to cause the balance member to further rotate forward, and the balance member and the movable arm interlock with each other to linearly move the sensor unit from inside the frame to the measurement position in the X direction.

According to the present invention, the actuator is energized to contract against the resilience of the spring; the balance member (rotational member) is caused to start rotating forward; the slider is subsequently pulled back using the resilience of the spring member to cause the balance member to further rotate forward; and the balance member and the movable arm interlock with each other to linearly move the sensor unit from inside the frame to the measurement position in the X direction. This mechanism employs a system where the actuator (shape-memory alloy wire) does not directly drive the sensor unit. Until the actuator contracts somewhat, the sensor unit does not start moving, as described above. Accordingly, the sensor unit is insusceptible to heat dissipation from the object to be measured, such as the monitor screen, and the possibility that the sensor unit may malfunction due to heat is extremely low.

The balance member and the movable arm interlock with each other, for example, in the following configurations: a slide pin formed on the slider is placed on a sidewall of the balance member; the slide pin is placed on a sidewall using a step formed on the balance member; and the slide pin is inserted into a long groove formed in the balance member.

In the sensor unit actuating mechanism of the present invention, the actuator is defined as a first actuator, and a second actuator disposed in the Y direction and having an end fixed to the balance member (rotational member) is further included. When energized, the second actuator contracts to cause the balance member to start rotating backward, and by energizing the first actuator without energizing the second actuator, the sensor unit is linearly moved from inside the frame to the measurement position in the X direction, and after the sensor makes a measurement, by energizing the second actuator without energizing the first actuator, the sensor unit is returned from the measurement position to the original position.

According to the present invention, an end of the first actuator (shape-memory alloy wire) and an end of the second actuator (shape-memory alloy wire) are fixed to the balance member (rotational member). Accordingly, by energizing the first actuator, the sensor unit is allowed to slide to the measurement position, or conversely, by energizing the second actuator, the sensor unit is allowed to slide and return to its original position. Further, these actuators are energized only when moving the sensor unit. During the other periods of time, that is, while the sensor unit is held at the measurement position or while the sensor unit is stored in the frame, these actuators are de-energized. Accordingly, there is provided a sensor unit actuating mechanism which is energy-saving and has high operation reliability.

The above configuration of the present invention will be described in more detail. For example, a movable arm is previously mounted on the sensor unit; a rotational plate having a laterally long groove is provided as the balance member (rotational member); and the movable arm is provided with a slider having a link pin which can be inserted into the laterally long groove; and by combining these components, a link structure is formed. Thus, these components are connected together in such a manner that an operation of each component is transmitted to the others with a short delay. Specifically, the movable arm and the rotational member are connected together in such a manner that an operation of the movable arm causes an operation of the rotational member with a delay, and an operation of the rotational member causes an operation of the movable arm with a delay. For example, when the first shape-memory alloy wire contracts, the combination of the pair of shape-memory alloy wires, the movable arm, and the rotational member, and the sensor unit moves the sensor unit rightward linearly; when the second shape-memory alloy wire contracts, that combination moves the sensor unit leftward linearly. Examples of the shape of the balance member (rotational member) include various shapes, such as a disc, a triangular plate, and a rectangular plate.

Effect of the Invention

According to the present invention, the actuator is energized to contract against the resilience of the spring member in the Y direction, and the sensor unit is linearly moved from inside the frame to the measurement position in the X direction using the guide member. Thus, a loss in stroke displacement is reduced and the sensor unit can leave or enter the frame smoothly. Further, the sensor unit can slide and return to its original position using the resilience of the spring member disposed in the Y direction. Further, when an external force to push back the sensor unit is applied to the sensor unit due to a prank by a child or the like, the balance member relaxes the external force. Accordingly, there is provided a sensor unit actuating mechanism having high operation reliability where there is no possibility that a load may be directly imposed on the shape-memory alloy wire.

For example, if a pair of arcuate members configured to relax the external force when bent are provided as the balance member, the sensor unit is allowed to slide to the measurement position by energizing the shape-memory alloy wire, and is allowed to slide and return to its original position after the measurement by de-energizing the shape-memory alloy wire. Thus, it is possible to form a sensor unit actuating mechanism using a minimum number of components. Alternatively, if, for example, a rotational member configured to relax the external force by rotating is included as the balance member, energizing the first shape-memory alloy wire allows the sensor unit to slide and move to the measurement position, and conversely, energizing the second shape-memory alloy wire allows the sensor unit to slide and return to its original position. In this configuration, the shape-memory alloy wires (first shape-memory alloy wire and second shape-memory alloy wire) do not directly drive the sensor unit. Accordingly, the sensor unit is insusceptible to heat dissipation from the monitor screen. Further, while the sensor unit is held at the measurement position or after the sensor unit is returned to its original position, these shape-memory alloy wires are de-energized. Accordingly, there is provided a sensor unit actuating mechanism that is energy-saving and has high operation reliability.

According to the present invention, a shape-memory alloy wire is used in place of an electric motor and thus there is a provided a thin actuating mechanism having an extremely small frame thickness. Accordingly, this sensor unit actuating mechanism is inconspicuous even when disposed on the bezel (frame) of a liquid crystal display device which is strongly required to be thinner. Further, incorporation of the sensor unit actuating mechanism of the present invention into a bezel around a liquid crystal screen results in a liquid crystal display device having high designability. Furthermore, there is provided a mechanism for coping with a prank by a child or the like, such as a push-back of the sensor unit.

BRIEF DESCRIPTION OF THE DRAWINGS

FIGS. 1(a) and 1(b) are perspective views illustrating an image display device including a sensor unit actuating mechanism of an embodiment of the present invention, in which FIG. 1(a) is a drawing showing a state where a sensor unit is extruded on the screen; and FIG. 1(b) is a drawing showing a state where the sensor unit is stored.

FIGS. 2(a) and 2(b) are perspective views illustrating a configuration where a sensor unit actuating mechanism of an embodiment of the present invention is retrofitted to a known image display device, in which FIG. 2(a) is a drawing showing a state where a sensor unit is extruded on the screen; and FIG. 2(b) is a drawing showing a state where the sensor unit is stored.

FIGS. 3(a) to 3(c) are structural diagrams illustrating a sensor unit actuating mechanism of a first embodiment of the present invention, in which FIG. 3(a) is a rear view seen from inside; FIG. 3(b) is a side view; and FIG. 3(c) is a front view seen from outside.

FIGS. 11(a) to 11(c) are structural diagrams illustrating a sensor unit actuating mechanism of a third embodiment of the present invention, in which FIG. 11(a) is a rear view seen from inside; FIG. 11(b) is a side view; and FIG. 11(c) is a front view seen from outside.

FIG. 19 is a structural diagram showing another example of the sensor unit actuating mechanism of the third embodiment and is a rear view seen from inside.

FIGS. 20(a) to 20(c) are structural diagrams illustrating a movable arm disposed in the sensor unit actuating mechanism of the third embodiment of the present invention, in which FIG. 20(a) is a rear view seen from inside; FIG. 20(b) is a side view; and FIG. 20(c) is a front view seen from outside.

FIGS. 21(a) to 21(c) are structural diagrams illustrating a rotational member disposed in the sensor unit actuating mechanism of the third embodiment of the present invention, in which FIG. 21(a) is a rear view seen from inside; FIG. 21(b) is a side view; and FIG. 21(c) is a front view seen from outside.

FIGS. 22(a) to 22(c) are structural diagrams illustrating the disposition of the rotational member and the first and second shape-memory alloy wires of the third embodiment, in which FIG. 22(a) is a rear view seen from inside; FIG. 22(b) is a side view; and FIG. 22(c) is a front view seen from outside.

FIGS. 23(a) to 23(c) are structural diagrams illustrating another example of the disposition of the rotational member and the first and second shape-memory alloy wires of the third embodiment, in which FIG. 23(a) is a rear view seen from inside; FIG. 23(b) is a side view; and FIG. 23(c) is a front view seen from outside.

FIGS. 24(a) to 24(c) are structural diagrams illustrating other examples of the disposition of the rotational member and the first and second shape-memory alloy wires of the third embodiment, in which FIG. 24(a) shows an example of a disc; FIG. 24(b) shows an example of a triangular plate; and FIG. 24(c) shows an example of a rectangular plate.

FIGS. 25(a) to 25(c) are structural diagrams illustrating the interlocking relationship between the rotational member and a slider of the movable arm of the third embodiment of the present invention, in which FIG. 25(a) is a diagram showing the relationship when a sensor unit is stored; FIG. 25(b) is a diagram showing the relationship when the first shape-memory alloy wire is being energized; and FIG. 25(c) is a diagram showing the relationship when the first shape-memory alloy wire is de-energized.

FIGS. 26(a) to 26(c) are structural diagrams illustrating the interlocking relationship between the rotational member and the slider of the movable arm of the third embodiment of the present invention, in which FIG. 26(a) is a diagram showing the relationship when the sensor unit is extruded on the screen; FIG. 26(b) is a diagram showing the relationship when the second shape-memory alloy wire is being energized; and FIG. 26(c) is a diagram showing the relationship when the second shape-memory alloy wire is de-energized.

EMBODIMENTS FOR CARRYING OUT THE INVENTION

Now, specific modes for carrying out the present invention will be described with reference to the drawings.

Embodiments of Present Invention

Figure 1A:
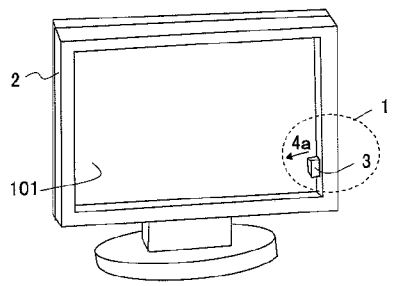
Figure 1B:
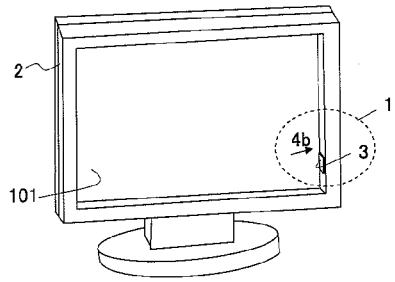

FIG. 1 shows a perspective view illustrating a liquid crystal display device including a sensor unit actuating mechanism 1 of an embodiment of the present invention. The sensor unit actuating mechanism 1 of the present embodiment is integrated into a bezel (frame) 2 disposed around a monitor screen (liquid crystal screen) 101 of the liquid crystal display device (liquid crystal monitor). A sensor unit 3 is a small planar (stick-shaped) unit configured to measure the luminance, chromaticity, or the like of the liquid crystal screen 101. To calibrate the monitor screen 101 each predetermined time, the sensor unit actuating mechanism 1 of the present embodiment extrudes the sensor unit 3 from the bezel 2 in the direction of reference numeral 4a and then move it to a measurement position on the monitor screen 101 so as to make a measurement (FIG. 1(a)); and returns the sensor unit 3 in the direction of reference numeral 4b and stores it in the bezel 2 after the measurement (FIG. 1(b)).

Figure 2A:
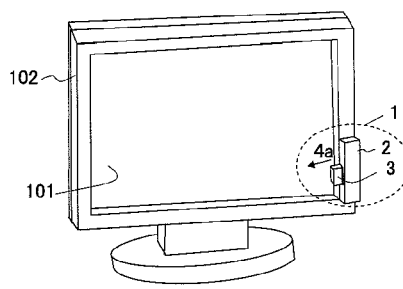
Figure 2B:
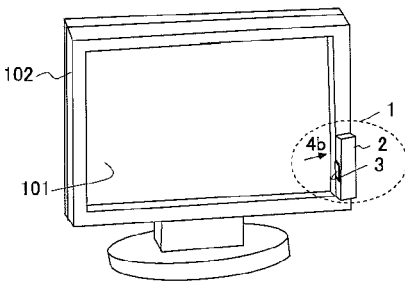

FIGS. 2(a) and 2(b) are perspective views illustrating a configuration where a sensor unit actuating mechanism 1 of an embodiment of the present invention is retrofitted to a known image display device. In FIGS. 2(a) and 2(b), a frame (main body) 2 of the sensor unit actuating mechanism 1 is mounted on an existing bezel 102. FIG. 2(a) is a diagram showing a state where a sensor unit 3 has been extruded from the frame 2 in the direction of reference numeral 4a and linearly moved to a measurement position on a screen 101; FIG. 2(b) is a diagram showing a state where the sensor unit 3 has been moved in the direction of reference numeral 4b and stored in the frame 2.

First Embodiment

Figure 3A:
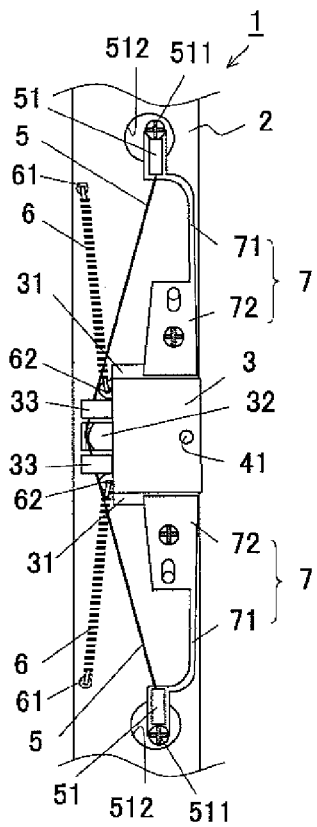
Figure 3B:
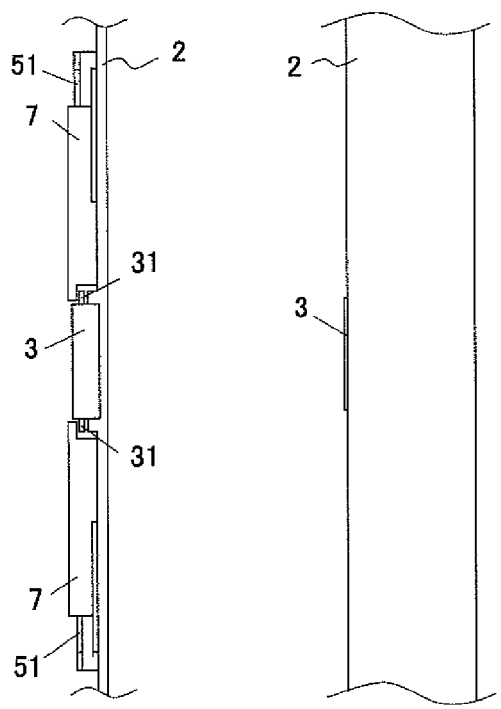
Figure 3C:
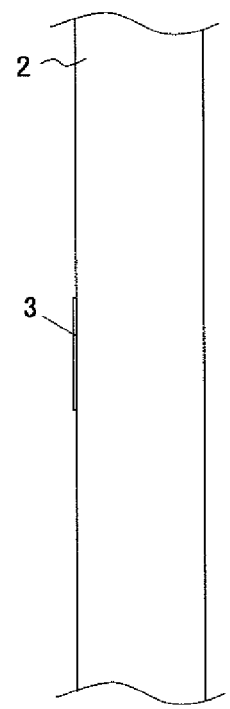

FIGS. 3(a) to 3(b) show structural diagrams illustrating a sensor unit actuating mechanism 1 of a first embodiment of the present invention. FIG. 3(a) is a rear view seen from inside, FIG. 3(b) a side view, and FIG. 3(c) a front view seen from outside. As used herein, the rear view seen from inside refers to a diagram when viewing the user from the monitor screen 101, and the front view seen from outside is a diagram when viewing the monitor screen 101 from the user. For the sake of description, the horizontal direction in the rear view is defined as an X direction, and the vertical direction therein as a Y direction.

A rectangular, planar sensor unit 3 of the sensor unit actuating mechanism 1 of the present embodiment is disposed on a bezel (frame) 2, and planar protruding members 31 serving as slide rails are integrally mounted on both sides of the sensor unit 3 (on the upper and lower sides thereof in FIG. 3(a)). A pair of arcuate members 7 serving as balance members are disposed on both sides of the sensor unit 3. Each arcuate member 7 includes an arcuate portion which is remote from the sensor unit 3 and a trapezoidal portion which is adjacent thereto. A recess formed in the trapezoidal portion and the frame 2 form a slide guide for receiving the corresponding protruding member (slide rail) 31 (FIG. 3(b)). That is, the pair of arcuate members 7 interpose both sides of the sensor unit 3, thereby supporting the sensor unit 3 in such a manner that the sensor unit 3 can slide.

The sensor unit 3 includes a sensor 41 used to measure a physical quantity of the monitor screen 101, such as luminance or chromaticity, and a circuit substrate for processing a signal from the sensor 41. In the present embodiment, the optical sensor 41 receives light from the monitor screen 101 via a round window formed in the sensor unit 3 and performs signal processing on the light (see FIG. 3(a)).

Formed on both sides of the rear end (a left portion of FIG. 3(a)) of the sensor unit 3 are hooks 62 for hanging ends of extension springs 6. Formed in a position on the frame 2 slightly behind the rear end of the sensor unit 3 are hooks 61 for hanging the other ends of the extension springs 6. In the present embodiment, the extension springs 6 forming a pair are each hung on the corresponding hooks 61 and 62 and simultaneously pull the sensor unit 3 by their resilience so as to pull back and store the sensor unit 3 into the frame 2.

Formed in the center of the rear end of the sensor unit 3 are a hook 32 and hooks 33 for hanging a shape-memory alloy wire 5 serving as an actuator and passing it through themselves (FIG. 3(a)). A groove is formed in the back surface of the hook 32. Similarly, grooves are formed in the front surfaces of the hooks 33. The shape-memory alloy wire 5 is hung on the groove of the centered hook 32 and the grooves of the hooks 33 disposed on both sides of the hook 32 and is passed through these grooves. Thus, the hook 32 and the hooks 33 interpose the shape-memory alloy wire 5 and support it in such a manner that the shape-memory alloy wire 5 is movable. The shape-memory alloy wire 5 of the present embodiment is composed of a single wire.

Connected to both ends of the shape-memory alloy wire 5 are electrode terminals 51. The electrode terminals 51 are screwed on electrodes 511 disposed at the tips of arcuate portions, which are remote from the sensor unit 3, of the arcuate members 7 (FIG. 3(a)). Circular recesses 512 are formed in the frame 2. Cylindrical protrusions under the electrodes 511 can move in the circular recesses 512 in a manner to draw an arcuate trajectory. Both ends of the shape-memory alloy wire 5 are fixed to the electrodes 511 which are located in positions remote from the sensor unit 3 on a line passing through a middle or front portion of the sensor unit 3. The center of the shape-memory alloy wire 5 is supported by the rear end of the sensor unit 3. When the shape-memory alloy wire 5 is de-energized, the sensor unit 3 is disposed inside the frame 2 as if a bow were bent (FIG. 3(a)).

Figure 4:
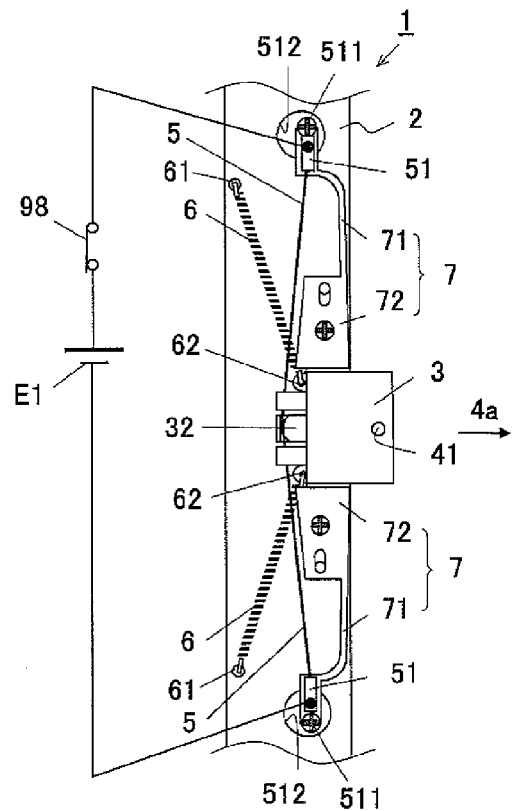
FIG. 4 is a diagram showing a state where a shape-memory alloy wire of the first embodiment is energized and a sensor unit is extruded on the screen.

FIG. 4 is a diagram showing a state where the single shape-memory alloy wire 5 included in the sensor unit actuating mechanism of the first embodiment is being energized. In an example shown in FIG. 4, a line drawn from one electrode terminal 51 is connected to a switch 98; a line from the switch 98 is connected to the positive side of a direct-current power supply E1; and a line from the negative side of the direct-current power supply E1 is connected to the other electrode terminal 51. Since the shape-memory alloy wire 5 of the present embodiment has no polarity, the upper side of the direct-current power supply E1 shown in FIG. 4 may be positive or the lower side thereof may be positive. The temperature in the vicinity of the monitor screen of the operating liquid crystal display device may increase from room temperature to around 50° C. To prevent such a temperature from causing a malfunction, a setting must be made such that the temperature of Joule heat generated by energizing the shape-memory alloy wire 5 exceeds 50° C. The temperature of heat that the shape-memory alloy wire 5 generates when energized is preferably 60° C. or more, more preferably about 70° C. for a stable contraction operation. In the present embodiment, the shape-memory alloy wire 5 performs a stable contraction operation by setting the line diameter thereof to 0.05 to 0.15 mm and the voltage of the direct-current power supply E1 to about 1.5 to 4.5 V.

By turning on the switch 98, the shape-memory alloy wire 5 is energized and thus contracts against the tensile force of the extension springs 6. The sensor unit 3 then slides in the direction of reference numeral 4a and is extruded from the frame 2, enabled to measure the luminance, chromaticity, or the like of the monitor screen 101, and then makes a measurement using the optical sensor 41 (FIG. 4).

Figure 5:
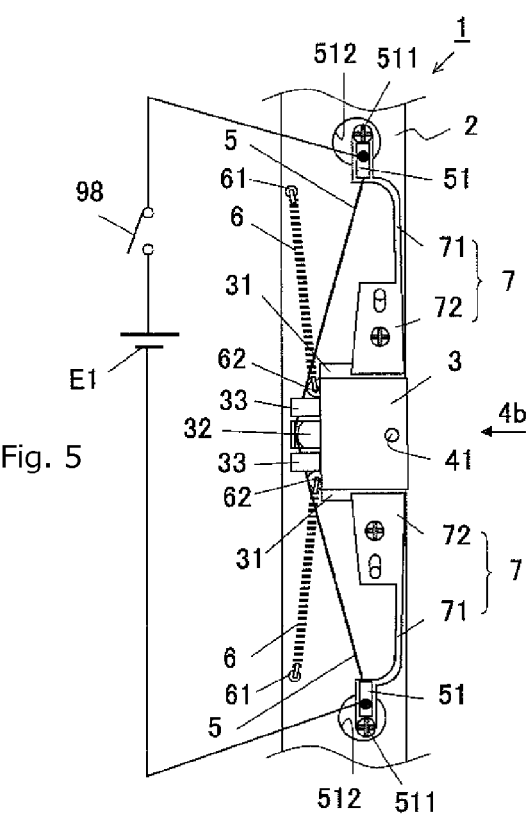
FIG. 5 is a diagram showing a state where the shape-memory alloy wire of the first embodiment is de-energized and the sensor unit is stored.

After the optical sensor 41 completes the measurement, the switch 98 is turned off to de-energize the shape-memory alloy wire 5. Due to heat dissipation, the shape-memory alloy wire 5 cools down to around the usual ambient temperature of the sensor unit 3 and restores its original length. Accordingly, the pair of extension springs 6 simultaneously pull the sensor unit 3 by their tensile force, causing the sensor unit 3 to slide in the direction of reference numeral 4b and be pulled back into the frame 2 (FIG. 5).

Figure 6:
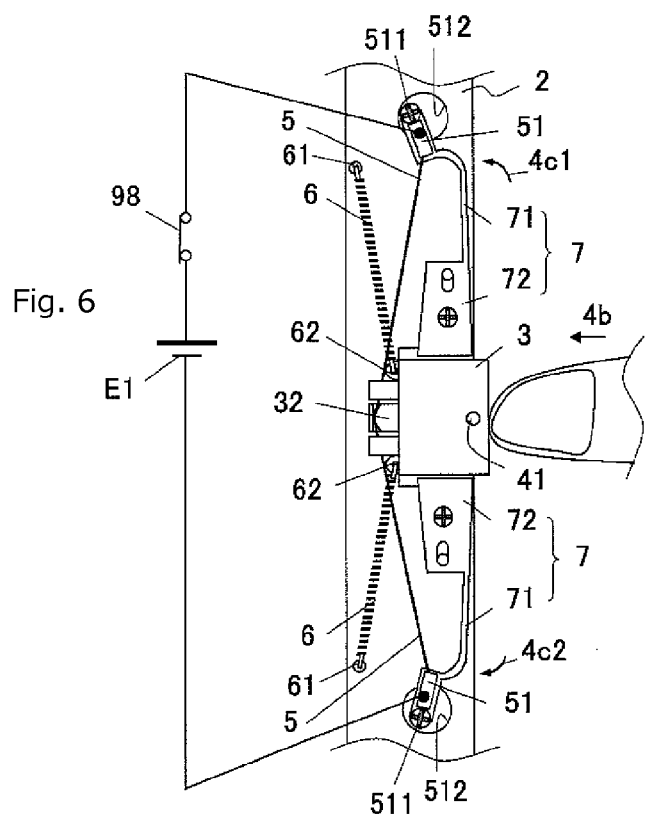
FIG. 6 is a diagram showing an operation when a child or the like pushes back the sensor unit with the shape-memory alloy wire of the first embodiment energized.

FIG. 6 shows an operation when a child or the like attempts to push back the sensor unit 3 in the direction of reference numeral 4b with a finger. Assume that the switch 98 is turned on to energize the shape-memory alloy wire 5, followed by the extrusion of the sensor unit 3 from the frame 2 and that a child or the like attempts to push back the extruded sensor unit 3 in the direction of reference numeral 4b. In this case, even a relatively weak force causes the sensor unit 3 to slide and be pushed back to the original position, since the tensile force of the pair of extension springs 6 is being applied to the sensor unit 3. At this time, since the shape-memory alloy wire 5 is energized and contracted, the pair of arcuate members 7 is bent in the direction of reference numeral 4c, then the external force from a child or the like is relaxed. This makes it difficult for a load to be directly imposed on the energized shape-memory alloy wire 5.

Second Embodiment

Figure 7:
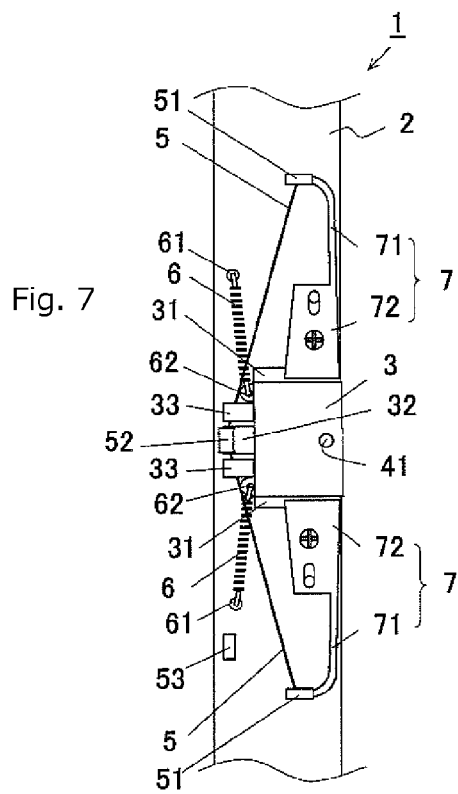
FIG. 7 is a structural drawing illustrating a sensor unit actuating mechanism of a second embodiment of the present invention and is a rear view seen from inside.

FIG. 7 is a structural diagram illustrating a sensor unit actuating mechanism 1 of a second embodiment of the present invention and is a rear view seen from inside. The same reference numerals denote the same functions and therefore description thereof will be omitted as appropriate. In the sensor unit actuating mechanism 1 of the second embodiment shown in FIG. 7, the component disposition surface of the frame 2 and the surfaces of the arcuate members 7 have conductivity. Thus, the electrode terminals 51 and an electrode terminal 53 are electrically connected together. Disposed in the center of the rear end of the sensor unit 3 is an electrode terminal 52 which is electrically connected to a middle portion of the shape-memory alloy wire 5.

Figure 8:
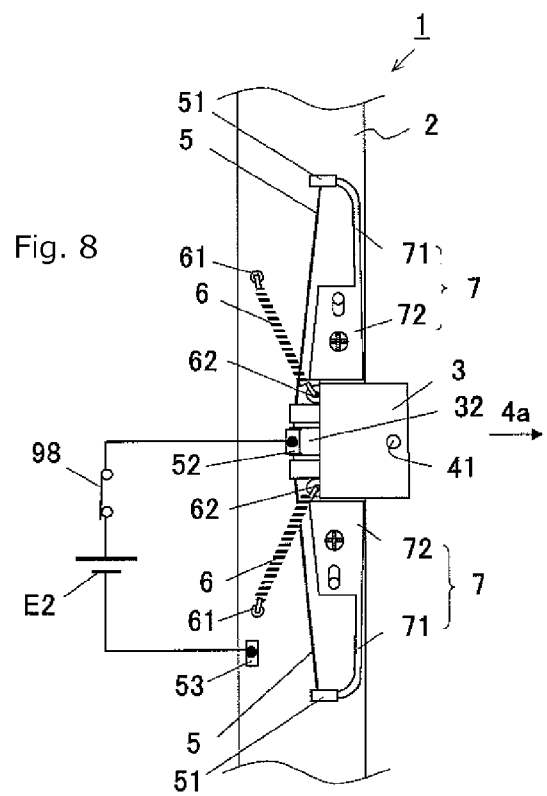
FIG. 8 is a diagram showing a state where a shape-memory alloy wire of the second embodiment is energized and a sensor unit is extruded on the screen.
Figure 9:
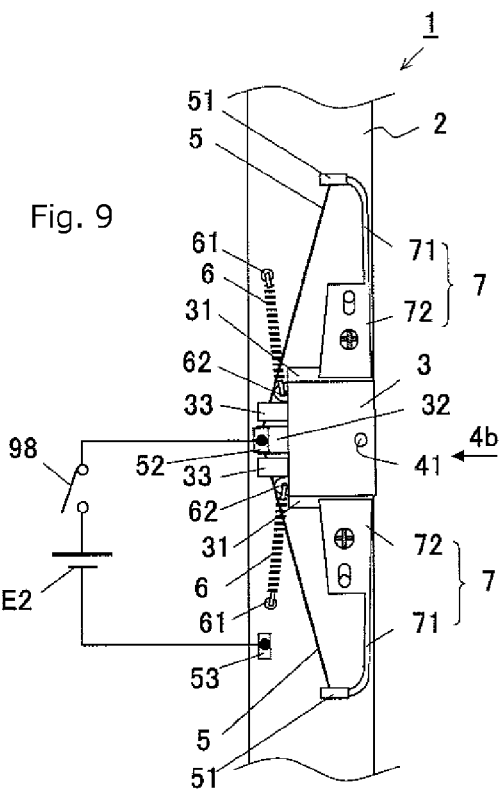
FIG. 9 is a diagram showing a state where the shape-memory alloy wire of the second embodiment is de-energized and the sensor unit is stored.
Figure 10:
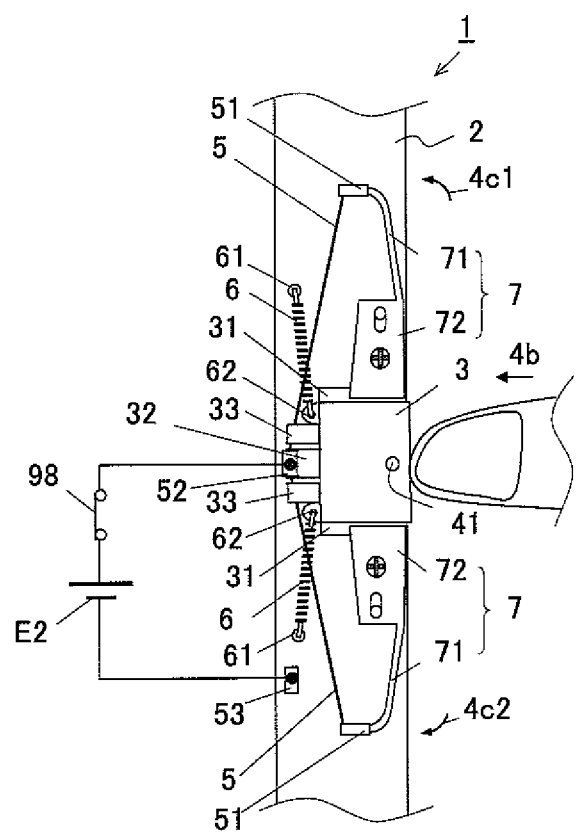
FIG. 10 is a diagram showing an operation of an arcuate member when a child or the like pushes back the sensor unit with the shape-memory alloy wire of the second embodiment energized.

FIG. 8 is a diagram showing a state where the shape-memory alloy wire 5 included in the sensor unit actuating mechanism of the present embodiment is energized. A line drawn from the electrode terminal 53 which is electrically connected to the pair of electrode terminals 51 is connected to the negative side of a direct-current power supply E2; a line drawn from the positive side of the direct-current power supply E2 is connected to the switch 98; and a line from the switch 98 is connected to the electrode terminal 52. In the second embodiment, as compared with the first embodiment, two parallel-connected shape-memory alloy wires 5, each having a length which is half that in the first embodiment, are energized. Thus, the voltage of the direct-current power supply E2 is half that of the direct-current power supply E1. In the present embodiment, similar operations to those in the first embodiment are performed. When the switch 98 is turned off, the shape-memory alloy wire 5 restores its original length. Thus, the pair of extension springs 6 simultaneously pulls the sensor unit 3 by their tensile force, causing the sensor unit 3 to slide in the direction of reference numeral 4b and be pulled back into the frame 2 (FIG. 9). Assume that a child or the like attempts to push back the sensor unit 3 which is extruded from the frame 2, in the direction of reference numeral 4b. In this case, even a relatively weak force causes the sensor unit 3 to slide and be pushed back to the original position, since the tensile force of the pair of extension springs 6 is being applied to the sensor unit 3 (FIG. 10).

Third Embodiment

Figure 11A:
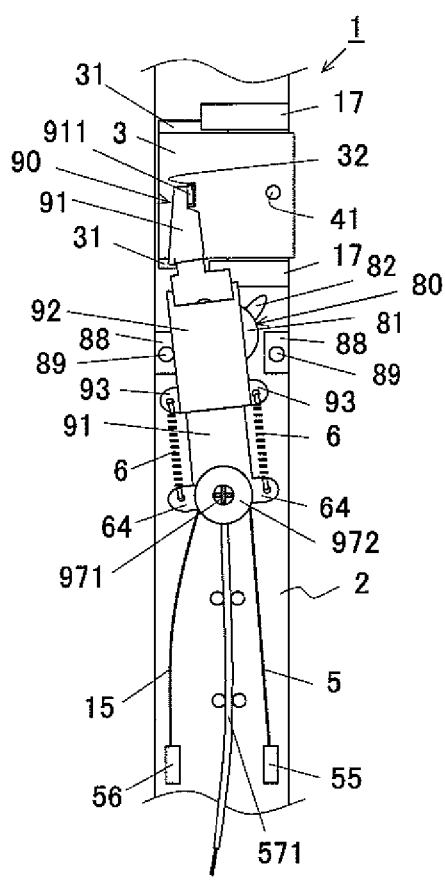
Figure 11B:
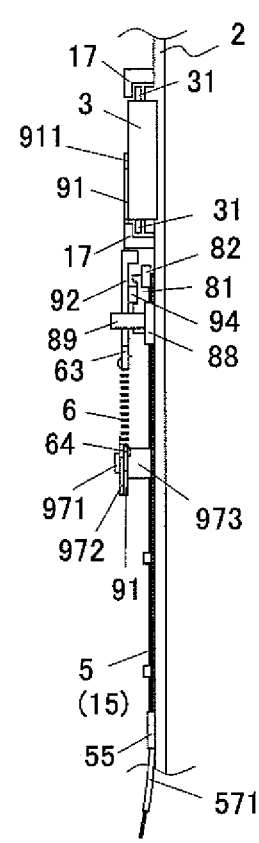
Figure 11C:
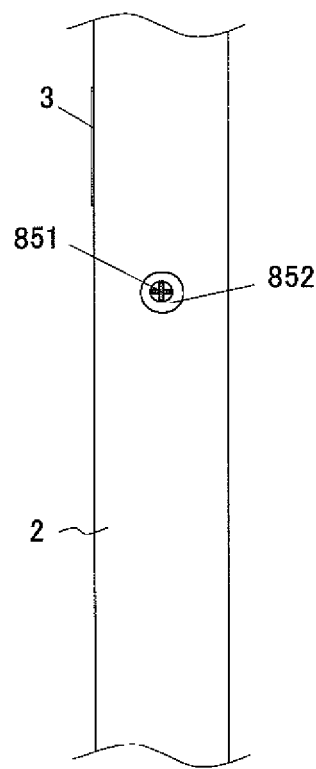

FIGS. 11(a) to 11(c) show structural diagrams illustrating the sensor unit actuating mechanism 1 of a third embodiment of the present invention. FIG. 11(a) is a rear view seen from inside, FIG. 11(b) a side view, and FIG. 11(c) a front view seen from outside. As used herein, the rear view seen from inside refers to a diagram when viewing the user from the monitor screen 101, and the front view seen from outside is a diagram when viewing the monitor screen 101 from the user. For the sake of description, the horizontal direction in the rear view is defined as an X direction, and the vertical direction therein as a Y direction. The same reference numerals denote the same functions and therefore description thereof will be omitted as appropriate.

In the sensor unit actuating mechanism 1 for screen measurement of the present embodiment, the rectangular, planar sensor unit 3 is disposed in the bezel (frame) 2, and planar protruding members 31 serving as slide rails are integrally mounted on both sides of the sensor unit 3 (on the upper and lower sides thereof in FIG. 11(a)). Guide members 17 which are L-shaped in a side view are disposed on both sides of the sensor unit 3. A recess formed in each guide member 17 and the frame 2 form a slide guide for receiving the corresponding protruding member (slide rail) 31 (FIG. 11(b)), thereby supporting both sides of the sensor unit 3 in such a manner that the sensor unit 3 can slide.

In the present embodiment, the sensor unit actuating mechanism 1 includes a movable arm 90 configured to move the sensor unit 3, a balance member (rotational member) 80 that is disposed under the movable arm 90 and can be displaced by external force, a first shape-memory alloy wire 5, and a second shape-memory alloy wire 15 (FIG. 11(a)). A rectangular groove (recess) 32 is formed near the back end on the rear surface (the surface having the optical sensor 41 thereon) of the sensor unit 3. A nail 911 disposed at the tip of a main body 91 of the movable arm 90 stops in the recess 32 in an engaged state. A hole 65 formed in the base of the main body 91 is placed on a cylindrical support stage 973 and the main body 91 is attached to the frame 2 using a flat washer 972 and a screw 971. Thus, the movable arm 90 is rotatably supported using the center of the hole 65 in the base of the main body 91 as a rotational center (see FIG. 11(a) and FIG. 20(a)). A cylindrical support stage 811 is integrally formed under the center of the rotational member 80 serving as a balance member. A center hole 84 of the rotational member 80 is attached to the frame 2 using a flat washer 852 and a screw 851. The rotational member 80 is rotatably supported using the center of the center hole 84 of the rotational member 80 as a rotational center (see FIGS. 11(a) and 21(a)). The first shape-memory alloy wire 5 and the second shape-memory alloy wire 15 are made of the same material and have the same dimensions.

While the movable arm 90 and the rotational member 80 are coupled together in an interlocking manner, they are coupled together in such a manner that an operation of one of them is transmitted to the other with a short delay. Specifically, the movable arm 90 and the rotational member 80 are coupled together in such a manner that an operation of the movable arm 90 causes an operation of the rotational member 80 with a delay and an operation of the rotational member 80 causes an operation of the movable arm 90 with a delay. When the first shape-memory alloy wire 5 contracts (contracts vertically in FIG. 11(a)), a combination of the set of shape-memory alloy wires 5, 15, the movable arm 90, the rotational member 80, and the sensor unit 3 allows the sensor unit 3 to slide rightward in FIG. 11(a); when the second shape-memory alloy wire 15 contracts (contracts vertically in FIG. 11(a)) this combination allows the sensor unit 3 to slide leftward in FIG. 11(a). Details will be described later.

Figure 25A:
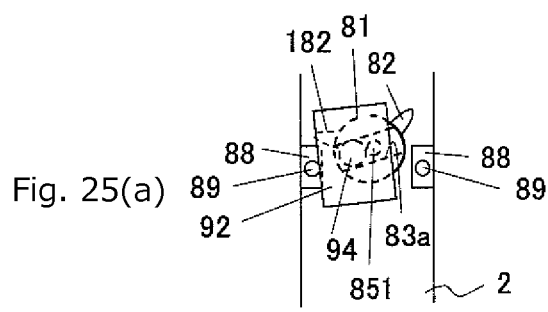
Figure 25B:
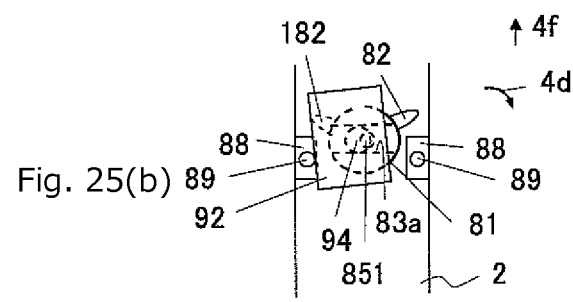
Figure 25C:
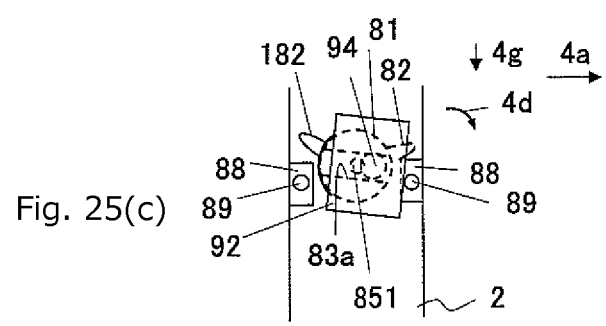

FIGS. 20(a) to 20(c) are structural diagrams illustrating the movable arm 90. FIGS. 21(a) to 21(c) are structural diagrams illustrating the rotational member 80. FIGS. 22(a) to 22(c) and FIGS. 23(a) to 23(b) are structural diagrams illustrating the disposition of the rotational member 80, the first shape-memory alloy wire 5, and the second shape-memory alloy wire 15. FIGS. 25(a) to 25(c) are structural diagrams illustrating the interlocking relationship between the movable arm 90 and the rotational member 80. The movable arm 90 and the rotational member 80 will be described below.

The main body 91 of the movable arm 90 is formed by press molding a planar metal member. A plastic slider 92 is inserted into the main body 91 in such a manner that the slider 92 can slide vertically in a predetermined range (FIG. 20). Formed on the left and right of the base of the main body 91 are hooks 64. Formed on the left and right of the base of the slider 92 are hooks 93. In the present embodiment, the extension springs 6 forming a pair are hung on the left hooks 93 and 64 and the right hooks 93 and 64, respectively, and pull the slider 92 toward the base of the movable arm 90 by their resilience. Formed in the center of the main body 91 of the movable arm 90 is a longitudinally long, rectangular groove 95 having rounded corners. Formed in the center of the slider 92 is a cylindrical link pin 94 which is oriented toward the front surface. The link pin 94 is inserted into the groove 95 in such a manner that the slider 92 can slide vertically in the vertical range of the longitudinally long groove 95 (FIG. 20).

A linear, laterally long groove 83 which laterally traverses a plastic disc main body 81 is formed in the rotational member 80. A pair of protrusions 182, 82 is provided on the left and right side surfaces of the disc main body 81 in a manner to protrude in upper left and upper right directions (in the directions of 2 and 10 o'clock of the hour hand of a clock). The protrusions 182, 82 abut on two stoppers 88 disposed on the frame 2 so that the rotational member 80 is prevented from rotating beyond the stoppers 88 (see FIG. 25). A cylindrical support stage 811 which is oriented toward the front surface is integrally formed in the center of the rotational member 80. A conductive metal washer 85 which is provided with a fastener 851 is fitted into the front surface of the rotational member 80 (FIG. 21(*c*)).

FIGS. 22(*a*) to 22(*c*) are structural diagrams illustrating the disposition of the rotational member 80, the first shape-memory alloy wire 5, and the second shape-memory alloy wire 15. The main body 81 of the rotational member 80 is disposed between the first shape-memory alloy wire 5 and the second shape-memory alloy wire 15. Ends of the first and second shape-memory alloy wires 5, 15 are hung, fixed, and electrically connected to the fastener 851 above the metal washer 85. Alternatively, a single shape-memory alloy wire 5 is hung, fixed, and electrically connected to the fastener 851 at its midpoint, thereby functionally using the single shape-memory alloy wire 5 as the first and second shape-memory alloy wires 5, 15. A flexible wire 571 is electrically connected to the rotational member 80 under the metal washer 85, thereby energizing the rotational member 80. The shape-memory alloy wire 5 (15) and the metal washer 85 may be fixed together using any connection method, as long as the connection method allows firm fixation and reliable electrical connection between the shape-memory alloy wire 5 (15) and the metal washer 85.

FIGS. 23(*a*) to 23(*c*) are structural diagrams showing another example of the disposition of the rotational member 80, the first shape-memory alloy wire 5, and the second shape-memory alloy wire 15. In the example shown in FIG. 23, the rotational member 80 is made of a metal. A single shape-memory alloy wire 5 is passed through a metal tube 582 and swaged at a midpoint thereof (with the joints brought into close contact with each other using a tool). The metal tube 582 is then inserted and fixed into a recess formed in an upper portion of the disc main body 81 of the rotational member 80. The shape-memory alloy wire 5 and the rotational member 80 are then electrically connected together using contact, soldering, or the like. Subsequently, the tip of a lead electrode 572 which is bent in an L-shaped form and has a leaf spring structure is press contacted with a lower portion of the disc main body 81 of the rotational member 80. Thus, the first and second shape-memory alloy wires 5 are energized. According to the present embodiment, the position of the lead electrode 572 is kept constant even when the rotational member 80 rotates. Thus, it is possible to maintain stable electrical connection and obtain an electrode lead structure having higher operation reliability.

FIGS. 24(*a*) to 24(*c*) are structural diagrams showing other examples of the disposition of the rotational member 80, the first shape-memory alloy wire 5, and the second shape-memory alloy wire 15. In the example shown in FIG. 24(*a*), the shape-memory alloy wires 5, 15 are attached to left and right predetermined positions of the disc 81 having the laterally long groove 83 formed therein and pull the disc 81 alternately. Thus, the disc 81 rotates clockwise or counterclockwise. In the example shown in FIG. 24(*b*), the shape-memory alloy wires 5, 15 are attached to left and right predetermined positions of a triangular plate 81 having the laterally long groove 83 formed therein and pull the triangular plate 81 alternately. Thus, the triangular plate 81 rotates clockwise or counterclockwise. In the example shown in FIG. 24(*c*), the shape-memory alloy wires 5, 15 are attached to left and right predetermined positions of a rectangular plate 81 having the laterally long groove 83 formed therein and pull the rectangular plate 81 alternately. Thus, the rectangular plate 81 rotates clockwise or counterclockwise. That is, the rotational member 80 of the present invention may have any shape, such as a disc, triangular plate, or rectangular plate, as long as the laterally long groove 83 is formed in the rotational member 80; ends of the shape-memory alloy wires 5, 15 disposed on the left and right of the rotational member 80 are fixed to predetermined positions of the rotational member 80; and the shape-memory alloy wires 5, 15 pull the rotational member 80 alternately, causing the rotational member 80 to rotate clockwise or counterclockwise.

Figure 26A:
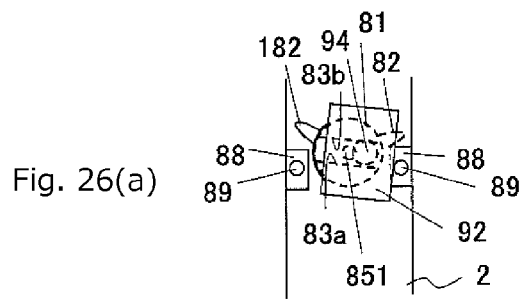
Figure 26B:
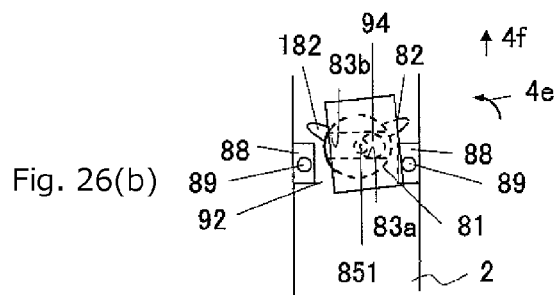
Figure 26C:
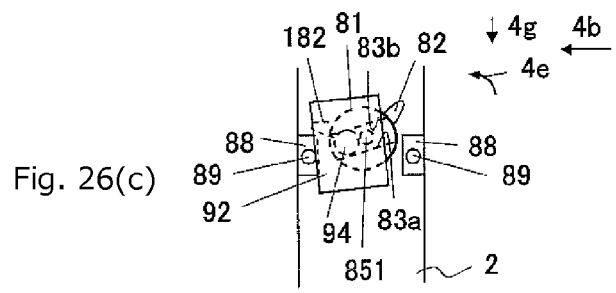
Figure 27:
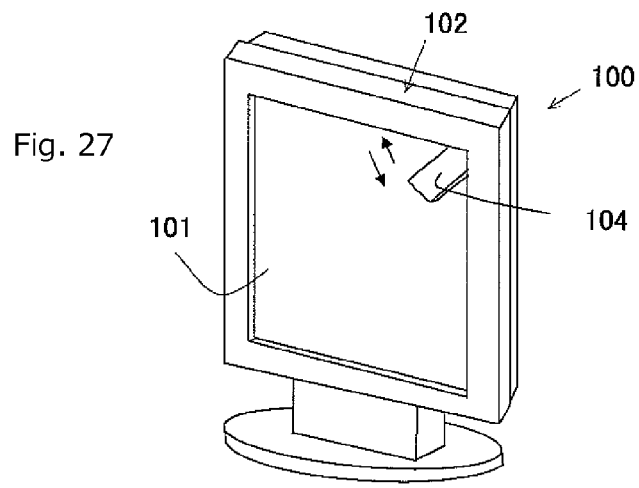
FIG. 27 is a perspective view showing the disposition of a traditional sensor unit actuating mechanism for image measurement.
Figure 28:
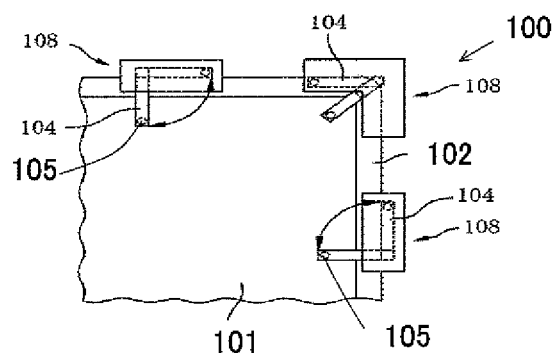
FIG. 28 is a front view showing another example of the disposition of a traditional sensor unit actuating mechanism for image measurement.

FIGS. 25(*a*) to 25(*c*) and FIGS. 26(*a*) to 26(*b*) are structural diagrams illustrating the interlocking relationship between the main body 81 of the rotational member 80 and the slider 92 of the movable arm 90. In the present embodiment, the link pin 94 of the slider 92 is inserted into the laterally long groove 83 of the disc main body 81 and makes a movement. Thus, the movable arm 90 and the rotational member 80 are coupled together in such a manner that an operation of one of them is transmitted to the other with a short delay.

FIG. 25(*a*) is a diagram showing the interlocking relationship between the disc main body 81 and the slider 92 when the second shape-memory alloy wire 15 is de-energized and the sensor unit 3 is stored. The link pin 94 of the slider 92 is placed on a lower sidewall 83*a* of the laterally long groove 83 of the disc main body 81. The disc main body 81 rotates counterclockwise, and the left protrusion 182 of the disc main body 81 abuts on the stopper 88 disposed on the left of the frame 2 and stops. At this time, the laterally long groove 83 of the disc main body 81 is inclined leftward, and the link pin 94 of the slider 92 is located in the lower left of the laterally long groove 83. Thus, the slider 92 is located in the lower left and abuts on a stopper pin 89. At this time, the pair of extension springs 6 contracts and restores their original state.

FIG. 25(*b*) is a diagram showing the positional relationship when the first shape-memory alloy wire 5 is being energized. When the first shape-memory alloy wire 5 is energized and thus starts contracting, the disc main body 81 rotates clockwise and the laterally long groove 83 of the disc main body 81 becomes horizontal. Thus, the link pin 94 of the slider 92 comes close to the center of the laterally long groove 83. At this time, the pair of extension springs 6 is pulled and extended. Until this point in time, the slider 92 moves only upward (in the direction of reference numeral 4*f*).

FIG. 25(*c*) is a diagram showing the positional relationship when the first shape-memory alloy wire 5 is de-energized.

When the first shape-memory alloy wire 5 is energized and thus contracts, the disc main body 81 further rotates clockwise. Thus, the laterally long groove 83 of the disc main body 81 is inclined rightward and the pair of extension springs 6 contracts due to their resilience (although the right spring first contracts and the left spring then contracts, both springs moves almost simultaneously). Thus, the link pin 94 of the slider 92 slides down to the lower right of the laterally long groove 83 without stopping, and the disc main body 81 rapidly rotates clockwise. Thus, the movable arm 90 is significantly inclined rightward. Thus, the sensor unit 3 coupled to the nail 911 at the tip of the main body 91 of the movable arm 90 is pushed out rightward and linearly moves from inside the frame 2 to a measurement position. At this time, the slider 92 moves in a direction obtained by combining the downward direction (the direction of reference numeral 4g) and the rightward direction (the direction of reference numeral 4a). Due to the clockwise rotation of the disc main body 81, the right groove 82 of the disc main body 81 abuts on the stopper 88 disposed on the right of the frame 2 and stops. The slider 92 is located at the lower right and abuts on the stopper pin 89. At this time, the pair of extension springs 6 contracts and restores their original state. To store, in the frame 2, the sensor unit 3 extruded on the screen 101 (FIG. 26(a)), the second shape-memory alloy wire 15 is energized to cause the disc main body 81 to rotate counterclockwise (FIG. 26(b)), and the rotational member 80 and the movable arm 90 are caused to perform operations reverse to the above operations. Thus, the sensor unit 3 is pulled back and stored into the frame 2 (FIG. 26(c)). The operation steps of the sensor unit 3 will be described below.

Figure 12:
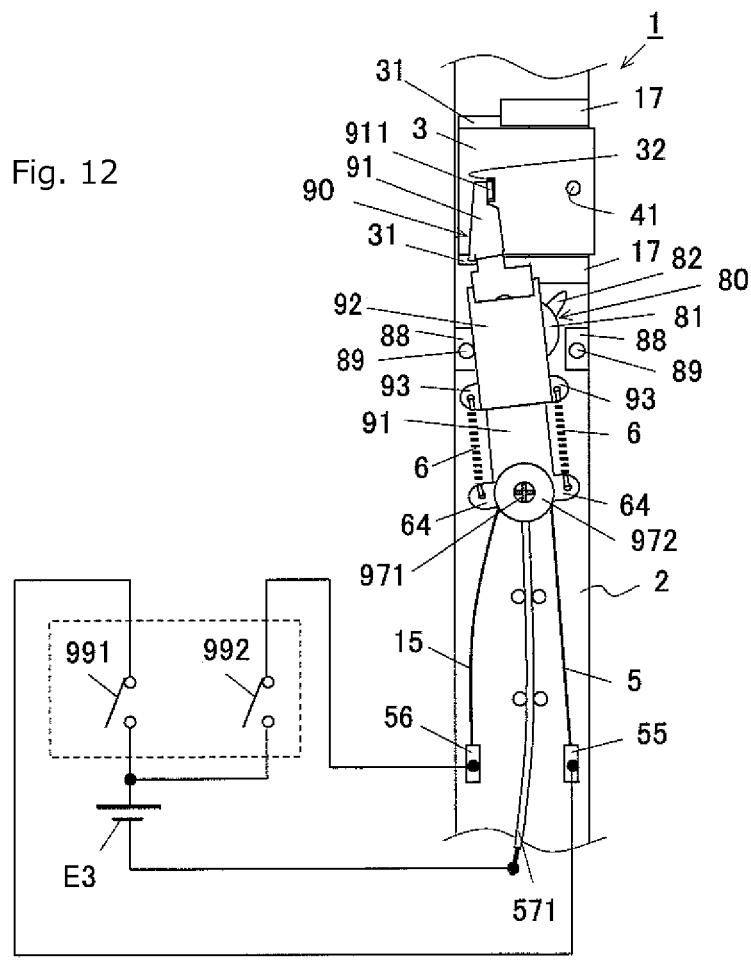
FIG. 12 is a diagram showing a state where first and second shape-memory alloy wires of the third embodiment are de-energized and a sensor unit is stored.

FIG. 12 shows a state where the sensor unit 3 is stored in the frame 2. As described above, ends of the first and second shape-memory alloy wires 5, 15 are fixed and electrically connected to the fastener 851 above the rotational member main body 81. Thus, the ends of the first and second shape-memory alloy wires 5, 15 are electrically connected to the flexible wire 571. The other end of the first shape-memory alloy wire 5 is electrically connected to an electrode terminal 55, which is then electrically connected to the positive side of a direct-current power supply E3 via a switch 991. The other end of the second shape-memory alloy wire 15 is electrically connected to an electrode terminal 56, which is then electrically connected to the positive side of the direct-current power supply E3 via a switch 992. The negative side of the direct-current power supply E3 is electrically connected to the flexible wire 571. The switches 991 and 992 are configured not to be turned on simultaneously, that is, configured such that one of the switches 991 and 992 is turned on or both are turned off. Accordingly, one of the first and second shape-memory alloy wires 5 and 15 is energized, or none of these shape-memory alloy wires is energized. The shape-memory alloy wires 5, 15 of the present embodiment have no polarity and therefore operate, regardless of which of the upper and lower sides of the direct-current power supply E3 shown in FIG. 12 is positive.

Figure 13:
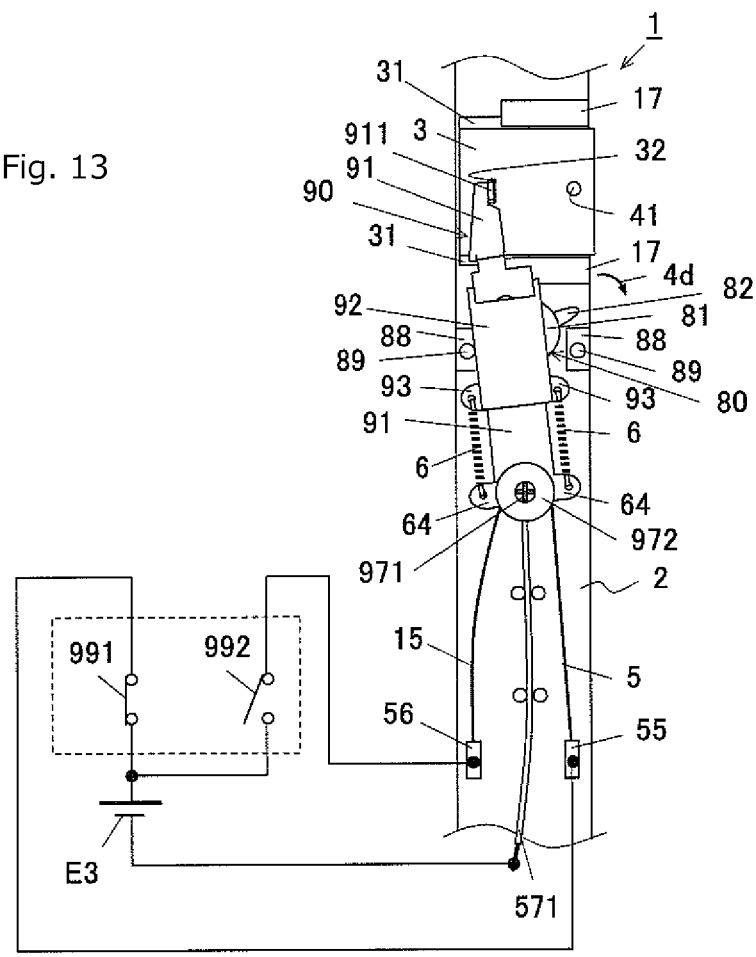
FIG. 13 is a diagram showing a state where the first shape-memory alloy wire of the shape-memory alloy wires of the third embodiment is being energized.
Figure 14:
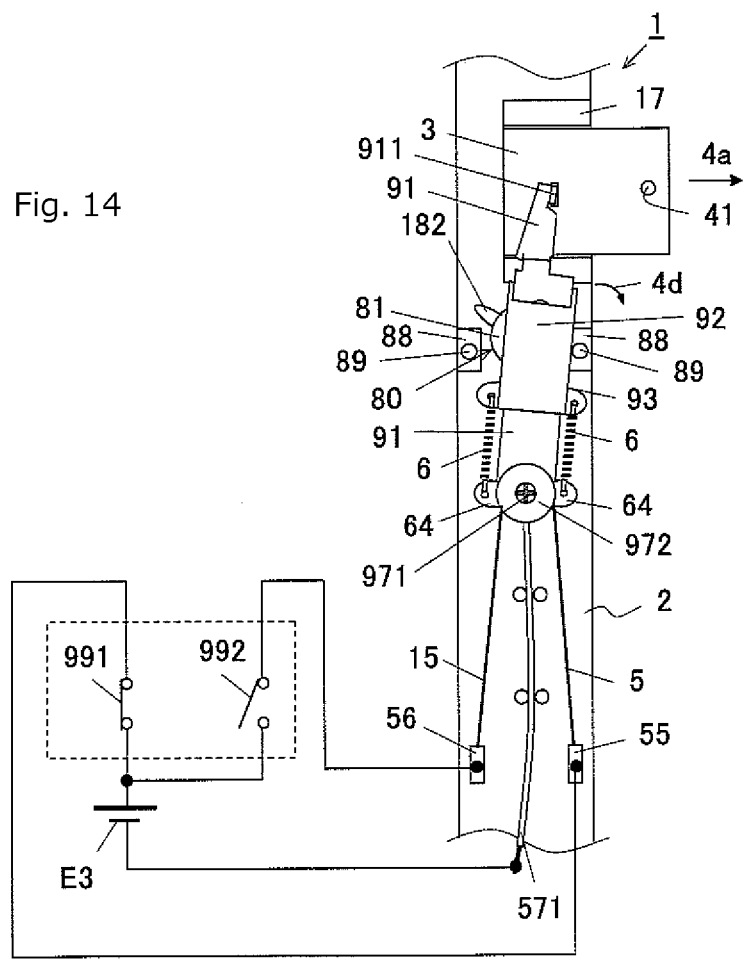
FIG. 14 is a diagram showing a state where the first shape-memory alloy wire of the shape-memory alloy wires of the third embodiment is immediately before de-energized.
Figure 15:
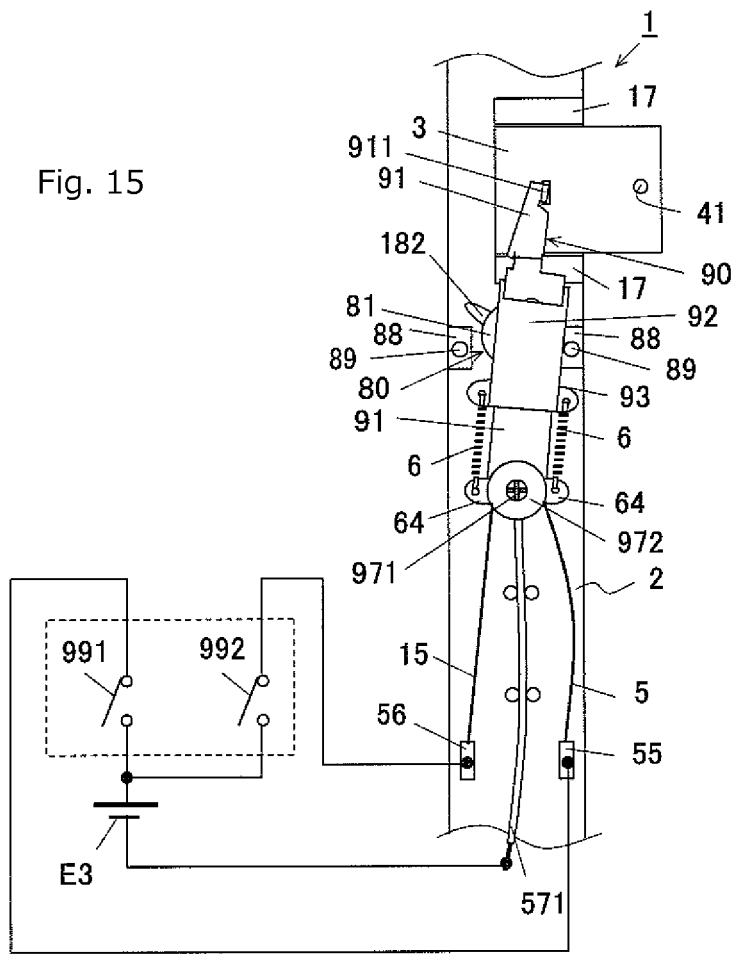
FIG. 15 is a diagram showing a state where the first shape-memory alloy wire of the shape-memory alloy wires of the third embodiment has been de-energized and a sensor unit has been moved to the measurement position on the screen.

By turning on the switch 991, the first shape-memory alloy wire 5 is energized and contracts against the tensile force of the extension springs 6. Thus, as described above, the rotational member 80 rotates clockwise (in the direction of reference numeral 4d), and the sensor unit 3 coupled to the movable arm 90 is pushed out rightward (in the direction of reference numeral 4a) (FIG. 13). When the rotational member 80 further rotates clockwise, the sensor unit 3 coupled to the movable arm 90 linearly moves from inside the frame 2 to a measurement position on the monitor screen 101 (FIG. 14), then the optical sensor 41 is enabled to measure the luminance, chromaticity, or the like of the monitor screen 101. At the point in time when the sensor unit 3 reaches the measurement position, the switches 991 and 992 are turned off. The first shape-memory alloy wire 5 cools down to around room temperature due to heat dissipation and thus restores its original length (FIG. 15).

Figure 16:
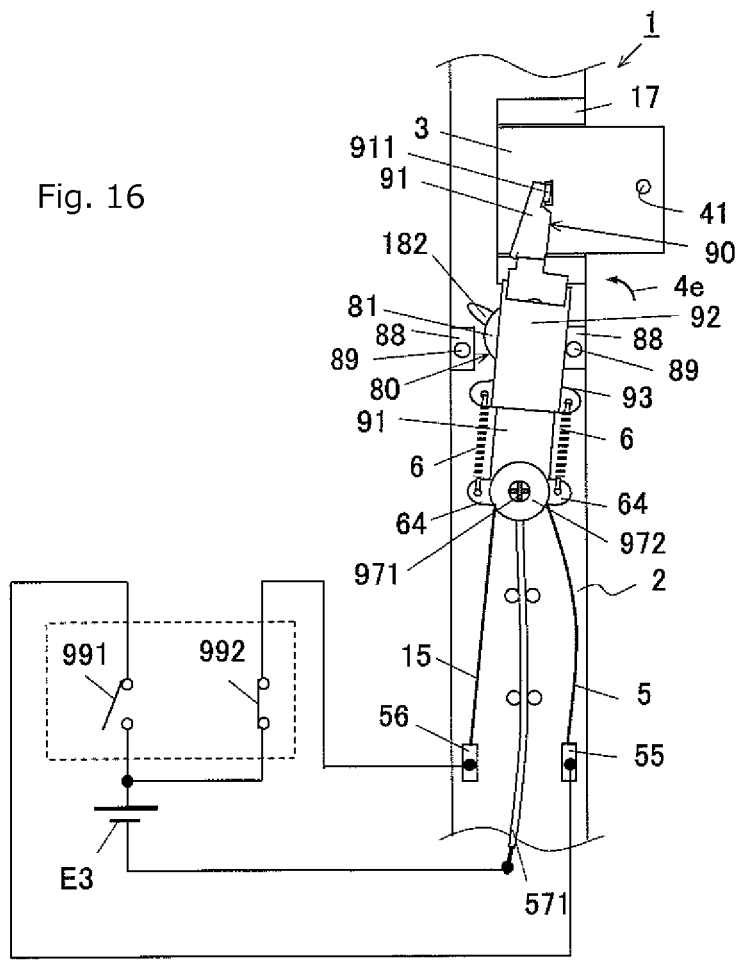
FIG. 16 is a diagram showing a state where the second shape-memory alloy wire of the shape-memory alloy wires of the third embodiment is being energized.
Figure 17:
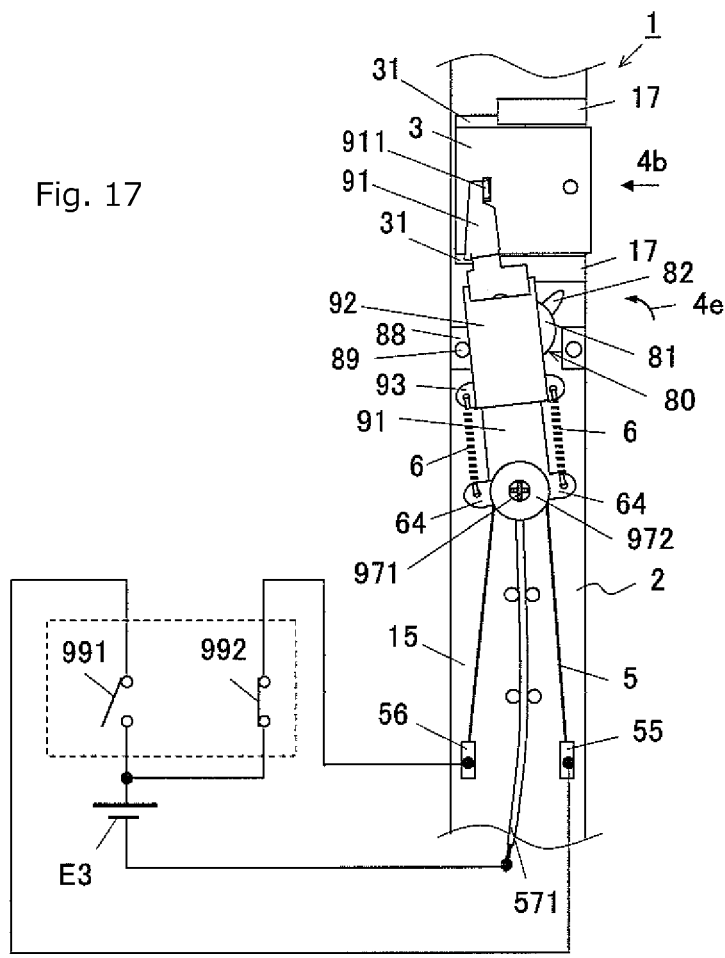
FIG. 17 is a diagram showing a state where the second shape-memory alloy wire of the shape-memory alloy wires of the third embodiment is immediately before de-energized.

After the optical sensor 41 measures the luminance, chromaticity, or the like of the monitor screen 101, the switch 992 is turned on to energize the second shape-memory alloy wire 15. Thus, the rotational member 80 rotates counterclockwise (in the direction of reference numeral 4e), and the rotational member 80 and the movable arm 90 perform operations reverse to the operations they have performed when pushing out the sensor unit 3. Thus, the sensor unit 3 moves leftward (in the direction of reference numeral 4b) (FIG. 16) and is pulled back and stored into the frame 2 (FIG. 17). At the point in time when the sensor unit 3 is stored, the switches 991 and 992 are turned off. The second shape-memory alloy wire 15 cools down to around the usual ambient temperature of the sensor unit 3 due to heat dissipation and thus restores its original length (FIG. 12).

According to the present embodiment, the shape-memory alloy wires (first shape-memory alloy wire 5 and second shape-memory alloy wire 15) employ a system which does not directly drive the sensor unit 3 and therefore the sensor unit 3 is insusceptible to heat dissipation from the monitor screen 101. Until the shape-memory alloy wires 5, 15 contract somewhat, the link pin 94 of the slider 92 does not cross the center serving as the boundary between one side and the other side in the laterally long groove 83 of the disc main body 81, as described above. Until then, the sensor unit 3 does not start moving. Accordingly, the possibility that the sensor unit 3 may malfunction due to heat is extremely low. Further, while the sensor unit 3 is held at the measurement position or when the sensor unit 3 is returned to its original position, the shape-memory alloy wires 5, 15 are de-energized. Thus, a sensor unit actuating mechanism 1 that is energy-saving and has high operation reliability is achieved.

Figure 18:
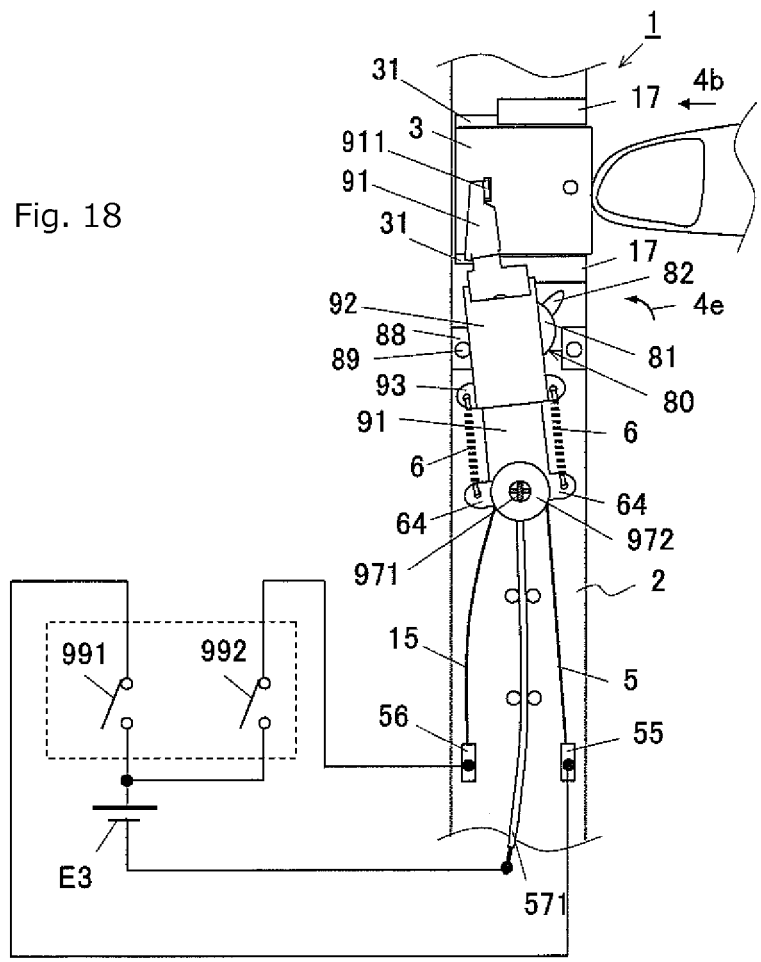
FIG. 18 is a diagram showing an operation when a child or the like pushes back the sensor unit with the first shape-memory alloy wire of the shape-memory alloy wires of the third embodiment de-energized.

FIG. 18 shows an operation when a child or the like attempts to push back the sensor unit 3 which is held at the measurement position, in the direction of reference numeral 4b out of curiosity. The shape-memory alloy wires 5, 15 are de-energized. When the sensor unit 3 is pushed back leftward (in the direction of reference numeral 4b), the rotational member 80 is rotated in the reverse direction by the link pin 94 of the slider 92. Thus, the rotational member 80 and the movable arm 90 perform operations reverse to the operations they have performed when pushing out the sensor unit 3, and the sensor unit 3 moves leftward (in the direction of reference numeral 4b) and is stored in the frame 2. That is, assume that a child or the like attempts to apply an external force to the sensor unit 3 by pushing it back with a finger. If the child or the like pushes the sensor unit 3 only slightly, the child or the like feels the resistance of the extension springs 6. If the child or the like releases the finger from the sensor unit 3 at this point in time, the sensor unit 3 is extruded to the measurement position. However, if the child or the like further pushes the sensor unit 3, the sensor unit 3 is pulled and stored into the frame 2 at the point in time when the link pin 94 of the slider 92 goes beyond the position of the center hole 84 of the rotational member 80. This eliminates the possibility that a load by the external force may be directly imposed on the de-energized shape-memory alloy wires 5, 15, thereby achieving a sensor unit actuating mechanism 1 having high operation reliability.

FIG. 19 is a structural diagram showing another example of the sensor unit actuating mechanism 1 of the third embodiment and is a rear view seen from inside. The same reference numerals denote the same functions and therefore description thereof will be omitted as appropriate. In the present embodiment, a longitudinally long, rectangular groove 641 is formed in the main body 91 of the movable arm 90. The single extension spring 6 pulls the slider 92 toward the base of the movable arm 90 by its resilience.

The present invention is not limited to the embodiments described above. For example, the actuators 5, 15 are not limited to the wire-shaped ones and may be planar, coiled, spiral, cylindrical, prismatic, or otherwise shaped ones, as long as the actuators contract against the resilience of the spring member when energized. The disposition or the like of the sensor unit 3 may be changed freely and multiple sensor units 3 may be disposed. If the shape-memory alloy wires 5, 15 are used as the actuators, any of direct current and alternating current may be passed through the actuators. The sensor unit actuating mechanism 1 of the present invention may be incorporated into a monitor which is being assembled, or may be incorporated into an assembled monitor. The present invention can be applied to various types of image display monitors, such as liquid crystal display devices, organic EL display devices, and plasma display devices. In addition, the invention can be used to measure various types of physical quantities, as long as there are provided the frame 2 disposed in the frame region around the object to be measured and the sensor unit 3 including the sensor 41 for measuring a physical quantity from the object to be measured. As seen above, changes can be made to the present invention as appropriate without departing from the spirit and scope of the invention.

DESCRIPTION OF NUMERALS

1: sensor unit actuating mechanism, 17: guide member, 2: frame (bezel), 3: sensor unit, 41: sensor (optical sensor), 5, 15: actuator (shape-memory alloy wire), 6: spring member (extension spring), 7: balance member (arcuate member), 80: balance member (rotational member), 90: movable arm, 91: movable arm main body, 92: slider, E1, E2, E3: direct-current power supply, 101: monitor screen (liquid crystal screen)

The invention claimed is:

1. A sensor unit actuating mechanism comprising:
a frame disposed around an object to be measured;
a sensor unit comprising a sensor for measuring a physical quantity from the object to be measured, the sensor unit being disposed inside the frame;
a guide member configured to guide the sensor unit to move in an X direction linearly, the X direction being a direction from inside the frame to a measurement position;
a spring member configured to expand or contract in a first Y direction, the spring member having one end fixed to the sensor unit and the other end fixed to the frame; and
an actuator configured to expand or contract in a second Y direction, the actuator disposed so as to move the sensor unit when the actuator is energized to contract, the first and second Y directions being a direction having an angle of 45 to 135 degrees or −45 to −135 degrees relative to the X direction and non-parallel to each other,
wherein the sensor unit is linearly moved from inside the frame to the measurement position in the X direction by energizing the actuator to contract against resilience of the spring.

2. The sensor unit actuating mechanism of claim 1, further comprising:
a flexible balance member having a base coupled to the frame,
wherein an end of the actuator is fixed to the balance member, and
wherein when an external force to push back the sensor unit from the measurement position to inside the frame in the X direction is applied to the sensor unit, the balance member is bent to relax the external force on the actuator.

3. The sensor unit actuating mechanism of claim 1,
wherein the actuators are shape-memory alloy wires that contract when energized and thus heated.

4. The sensor unit actuating mechanism of claim 1,
wherein the object to be measured is a monitor screen,
wherein the sensor is an optical sensor configured to measure luminance, chromaticity, or the like of the monitor screen, and
wherein the frame having the sensor unit disposed inside is a bezel around the monitor screen or is a separate frame attached to the bezel.

5. A liquid crystal display device comprising:
the sensor unit actuating mechanism of claim 1, the frame having the sensor unit disposed inside is a bezel around a liquid crystal screen.

6. A sensor unit actuating mechanism comprising:
a frame disposed around an object to be measured;
a sensor unit comprising a sensor for measuring a physical quantity from the object to be measured, the sensor unit disposed inside the frame;
a guide member configured to guide the sensor unit to move in an X direction linearly, the X direction being a direction from inside the frame to a measurement position;
a spring member configured to expand or contract in a first Y direction, the first Y direction being a direction having an angle of 45 to 135 degrees or −45 to −135 degrees relative to the X direction, the spring member having one end fixed to the sensor unit and the other end fixed to the frame; and
an actuator configured to expand or contract in a second Y direction, the second Y direction being a direction having an angle of 45 to 135 degrees or −45 to −135 degrees relative to the X direction, the actuator disposed to move the sensor unit when the actuator is energized to contract, further comprising:
a rotatable balance member having a shaft coupled to the frame,
a movable arm having a tip attached to the sensor unit, the movable arm being rotatable using a base thereof as a rotational axis,
wherein a slider capable of sliding in a third Y direction is disposed in a main body of the movable arm, the third Y direction being a direction having an angle of 45 to 135 degrees or −45 to −135 degrees relative to the X direction,
wherein a shaft of the balance member is coupled to the frame,
wherein an end of the spring member is attached to the base of movable arm to pull the slider, and the other end thereof is attached to the slider;
wherein an end of the actuator is fixed to the balance member to cause the balance member to start rotating forward, and the other end thereof is coupled to the frame,
wherein the movable arm and the balance member interlock with each other, and
wherein the actuator is energized to contract against the resilience of the spring, thereby causing the balance member to start rotating forward, and the slider is subsequently pulled back using the resilience of the spring member to cause the balance member to further rotate forward, and the balance member and the movable arm interlock with each other to linearly move the sensor unit from inside the frame to the measurement position in the X direction.

7. The sensor unit actuating mechanism of claim 6,
wherein the actuator is defined as a first actuator, further comprising:
a second actuator disposed in a fourth Y direction and having an end fixed to the balance member, the fourth Y direction being a direction having an angle of 45 to 135 degrees or −45 to −135 degrees relative to the X direction,
wherein when energized, the second actuator contracts to cause the balance member to start rotating backward, and
wherein by energizing the first actuator without energizing the second actuator, the sensor unit is linearly moved from inside the frame to the measurement position in the X direction, and after the sensor makes a measurement, by energizing the second actuator without energizing the first actuator, the sensor unit is returned from the measurement position to the original position.

\* \* \* \* \*